United States Patent
Gauthier et al.

(10) Patent No.: US 9,810,963 B2
(45) Date of Patent: Nov. 7, 2017

(54) SEAL AND SEAL SYSTEM FOR A LAYERED DEVICE

(71) Applicant: SWITCH MATERIALS INC., Burnaby (CA)

(72) Inventors: Simon James Gauthier, Vancouver (CA); Andrew Koutsandreas, Vancouver (CA); Duhane Lam, Vancouver (CA); Jonathan Ross Sargent, Vancouver (CA); Peter Alexander Von Hahn, Vancouver (CA)

(73) Assignee: Switch Materials, Inc., Burnaby (CA)

( * ) Notice: Subject to any disclaimer, the term of this patent is extended or adjusted under 35 U.S.C. 154(b) by 0 days.

(21) Appl. No.: 14/773,698

(22) PCT Filed: Mar. 6, 2014

(86) PCT No.: PCT/CA2014/000191
§ 371 (c)(1),
(2) Date: Sep. 8, 2015

(87) PCT Pub. No.: WO2014/134714
PCT Pub. Date: Sep. 12, 2014

(65) Prior Publication Data
US 2016/0033841 A1    Feb. 4, 2016

Related U.S. Application Data

(60) Provisional application No. 61/774,480, filed on Mar. 7, 2013, provisional application No. 61/910,261, filed on Nov. 29, 2013.

(51) Int. Cl.
*G02F 1/15*    (2006.01)
*G02F 1/07*    (2006.01)
(Continued)

(52) U.S. Cl.
CPC ........... *G02F 1/161* (2013.01); *B23K 26/38* (2013.01); *B23K 26/402* (2013.01);
(Continued)

(58) Field of Classification Search
CPC . B23K 26/402; B23K 26/38; B23K 2203/172
(Continued)

(56) References Cited

U.S. PATENT DOCUMENTS 5,724,187 A * 3/1998 Varaprasad ............ B32B 17/06
359/265
5,822,107 A * 10/1998 Lefrou ............ B32B 17/10036
345/205
(Continued)

FOREIGN PATENT DOCUMENTS

JP    2002-268096 A    9/2002
JP    2003-140197      5/2003
WO    WO 2013/117847 A1    8/2013

OTHER PUBLICATIONS

European Invitation Pursuant to Rule 62a(1) EPC, European Application No. 14760038.1, Jul. 7, 2016, 2 pages.
(Continued)

*Primary Examiner* — Tuyen Tra

(57) ABSTRACT

The disclosure provides, in part a seal system for sealing a film. The disclosure further provides, in part, a sealed film comprising a first and a second substrate; a first and a second electrode disposed on the surface of at least one of the substrates; a switching material disposed between the first and second substrates; a first seal and a second seal; the first seal disposed along an edge of the switching material, separating the switching material from the second seal.

18 Claims, 10 Drawing Sheets

(51) Int. Cl.
  *G02F 1/161* (2006.01)
  *G02F 1/1339* (2006.01)
  *B23K 26/38* (2014.01)
  *B23K 26/402* (2014.01)
  *B23K 103/16* (2006.01)

(52) U.S. Cl.
  CPC ...... *G02F 1/1339* (2013.01); *B23K 2203/172* (2015.10); *G02F 2201/506* (2013.01)

(58) Field of Classification Search
  USPC .................. 359/265–275, 245; 345/105, 107
  See application file for complete search history.

(56) References Cited

U.S. PATENT DOCUMENTS

| | | |
|---|---|---|
| 6,195,193 B1 | 2/2001 | Anderson et al. |
| 2005/0195488 A1 | 9/2005 | McCabe et al. |
| 2007/0152956 A1 | 7/2007 | Danner et al. |
| 2008/0239452 A1* | 10/2008 | Xu .......................... G02C 7/101 359/265 |
| 2010/0315693 A1 | 12/2010 | Lam et al. |

OTHER PUBLICATIONS

European Extended Search Report, European Application No. 14760038.1, Nov. 10, 2016, 10 pages.

PCT International Search Report, PCT/CA2014/000191, Mar. 6, 2014, 14 pages.

PCT Written Opinion, PCT Application No. PCT/CA2014/000191, Aug. 27, 2014, 8 pages.

\* cited by examiner

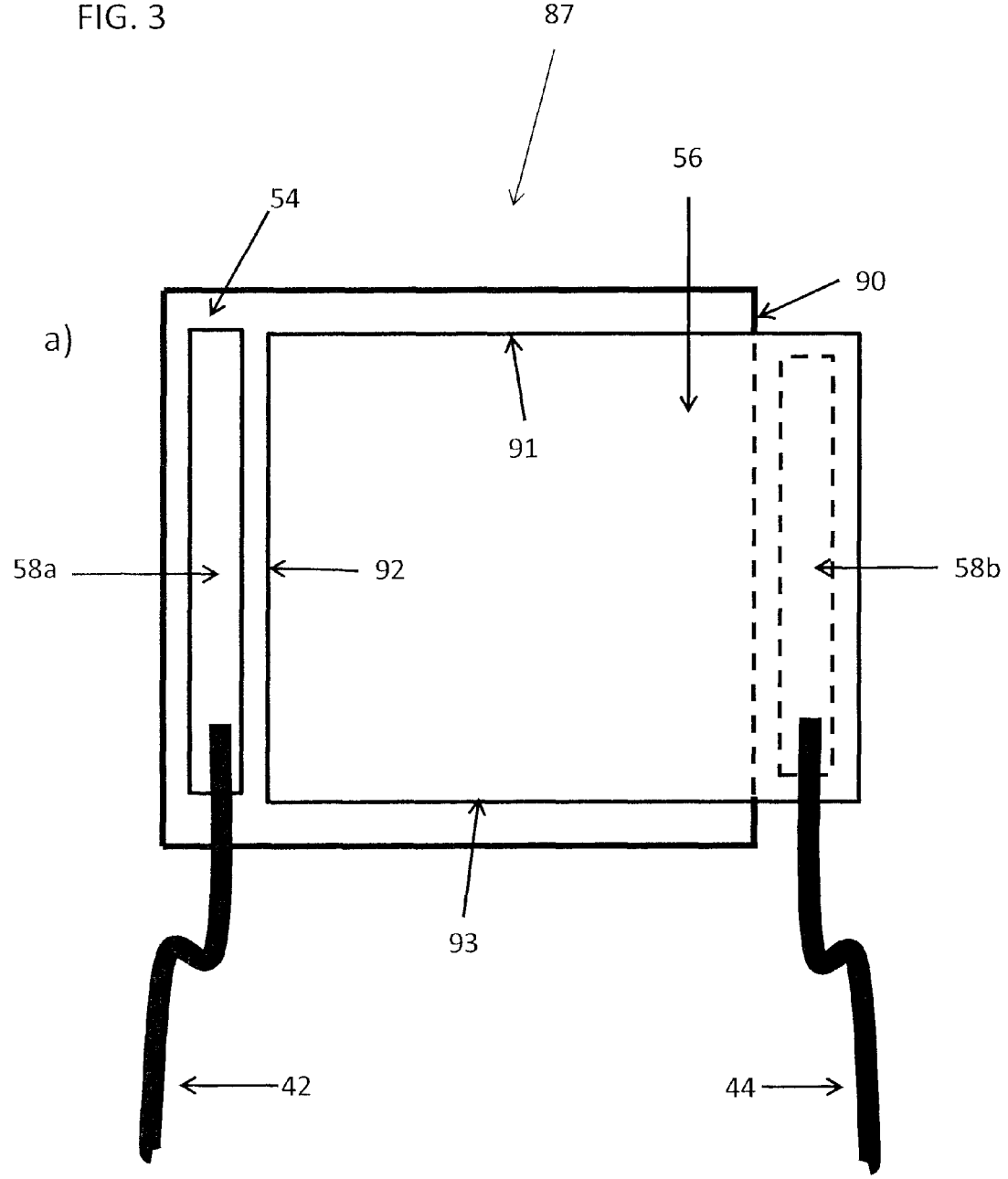

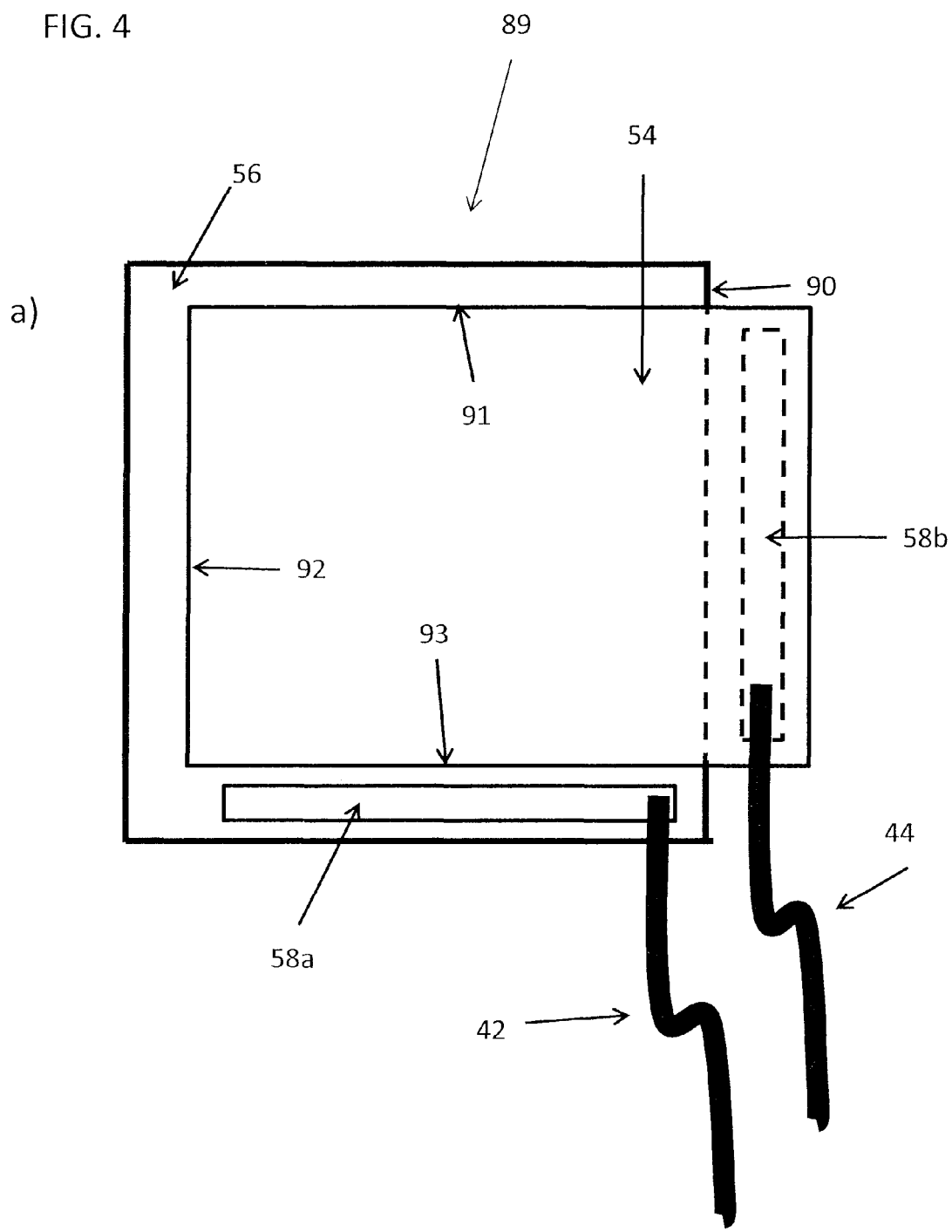

SEAL AND SEAL SYSTEM FOR A LAYERED DEVICE

This application claims the benefit of international application no. PCT/CA2014/000191, filed Mar. 6, 2014, and U.S. Provisional Application Nos. 61/774,480 filed Mar. 7, 2013, and No. 61/910,261, filed Nov. 29, 2013; each of which is incorporated herein by reference in its entirety, for all purposes.

TECHNICAL FIELD

The present disclosure relates to a seal system for a layered device. The layered device may have a switchable layer, and may include an optical filter or a laminated glass.

BACKGROUND

A switchable film may generally comprise two substrates, with a switchable material disposed therebetween. Depending on the nature of the switchable material, it may be advantageous to provide a seal around the perimeter of the switchable material to keep it separated from water, air, oxygen or other aspects of the external environment. This may be beneficial in preserving function, or preventing degradation or diminished performance.

The configuration of the seal, and the manner in which is it applied or assembled for the switchable film or switchable device may be governed, at least in part, by the nature of the switchable material and how it is applied. Some electrochromic devices (e.g. electrochromic mirrors) may have the substrates and seals assembled and cured, to first to provide a chamber. The chamber is subsequently filled by vacuum-pulling the switching material into the chamber. As the seal material is cured or solidified before exposure to the switching material, undesirable reactions of the switching material with a component of an uncured, or partially cured seal is avoided. For a switching material coated onto a moving web or film, that is to be cut to a desired shape, this method of pre-assembly of the chamber, although it may have a good seal, would not be appropriate, and other ways to avoid exposing a switching material to an uncured, or partially cured seal material may be sought.

A useful aspect in the mass production of device which comprise one or more seals or seal systems, is the ability to detect a failure of the seal during the production process. A breach of a seal in a device may result in a product with reduced durability or function, or a device that has, or will, fail. In some cases, the breach of a seal system may not be detected, or detectable, for some time after fabrication or after several hours, days, months or years of service. Sale or use of an article comprising the switchable film with a deficient seal may result in costly warranty and or safety issues. Thus, it may be beneficial to employ a seal or sealing system, in a switchable device that includes one or more detectors, or indicators built into the seal that would make the device identifiable, or attract the attention of an inspector or user in the event of a seal breach during production or storage, or in use.

SUMMARY

The present disclosure relates to a seal for a switchable film. The switchable film may be included in a switchable device, such as an optical filter or a switchable, laminated glass.

In accordance with one aspect, there is provided a seal for a switchable laminated glass, comprising: a first seal contacting an edge of a layer of switching material; the switching material laminated between a first and a second substrate and in contact with first and second electrodes distributed on the first, the second or the first and the second substrates.

In accordance with another aspect, there is provided a seal for a switchable laminated glass comprising: a first seal, adhereable to a conductive metal oxide electrode and compatible with a switching material of the switchable laminated glass.

In accordance with another aspect, there is provided an encapsulated switchable film comprising: a first substrate and a second substrate; a first electrode and a second electrode disposed upon the first, the second or the first and the second substrate; a layer of switching material disposed between the first and the second substrates; an electrical connector for electrically connecting the first and the second electrodes to a power source; and a first seal contacting an edge of the layer of switching material.

In accordance with another aspect, there is provided a sealed film comprising a first and second substrate, a first and second electrode disposed on the surface of at least one of the substrates, a switching material disposed between the first and second substrates, and a first seal and a second seal; the first seal disposed along an edge of the switching material, separating the switching material from the second seal.

In accordance with another aspect, there is provided a system for sealing a switchable film comprising a bead of a first seal along an exposed edge of a switching material, and a second seal encapsulating the first seal.

In accordance with another aspect, there is provided a method for sealing a switchable film comprising: a) providing a switchable film comprising a first and a second substrate with a first and second electrode disposed on the surface of at least one of the substrates, and a switching material disposed between the first and second substrates; b) disposing a first seal in contact with an electrode and adjacent to the switching material; c) disposing a second seal adjacent to the first seal.

The method may further comprise a step b1) affixing a transparent liner to the first and second substrates.

In accordance with another aspect, there is provided an encapsulated switchable film comprising: a) a layer of switching material between a pair of parallel substrates; a first seal surrounding the layer of switching material; b) first and second encapsulating layers affixed to a second surface of the substrate; and c) a second seal disposed between the first and second encapsulating layers, and separated from the switching material by the first seal.

In accordance with another aspect, there is provided a method for encapsulating a switchable film comprising: a) providing a switchable film comprising a first and a second substrate with a first and second electrode disposed on the surface of at least one of the substrates, and a switching material disposed between the first and second substrates; b) disposing a first seal in contact with an electrode and adjacent to the switching material; c) affixing a transparent layer to the first and second substrates; and d) disposing a second seal adjacent to the first seal, the second seal separated from the switching material by the first seal.

In accordance with another aspect, there is provided a method for encapsulating a switchable film comprising: a) providing a switchable film comprising a first and a second substrate with a first and second electrode disposed on the surface of at least one of the substrates, and a switching material disposed between the first and second substrates; b) affixing a transparent layer to the first and second substrates; and c) disposing a first seal in a space defined at least in part by an edge of the switching material and the transparent layers affixed to the first and second substrates.

In accordance with another aspect, there is provided a laminated glass comprising: a) a first substrate and a second substrate; b) a first electrode and a second electrode disposed upon the first, the second or the first and the second substrate; c) a layer of switching material disposed between the first and the second substrates; d) an electrical connector for electrically connecting the first and the second electrodes to a power source; and e) a first seal contacting an edge of the layer of switching material.

In accordance with another aspect, there is provided a method of cutting a switchable film, comprising the steps of providing a switchable film, directing laser radiation at the film to cut a weed portion comprising a portion of a first substrate, but not a second substrate of the switchable film, leaving the conductive layer of the second substrate intact.

In some aspects, the switching material is in contact with the first and the second electrodes.

In some aspects, the first seal encapsulates an electrical connector.

In some aspects, the first substrate is offset along at least two adjacent edges relative to the second substrate. The offset edges provide for a busbar mounting platform. In some aspects, the first substrate may be offset along a substantive portion of the periphery, relative to the second substrate. In some aspects, one or more overhanging tabs may extend from a first substrate, beyond a periphery of a second substrate, to provide a busbar mounting platform.

In some aspects, the first and second electrodes comprise a conductive metal oxide.

In some aspects, the first seal contacts the conductive metal oxide.

In some aspects, the first seal is adherent to the conductive metal oxide.

In some aspects, the laminated glass further comprises a second seal, encapsulating the first seal and electrical connectors.

In some aspects, the first seal, second seal, or first seal and second seal is selected from a group comprising silicones, natural rubbers, synthetic rubbers or elastomeric materials.

In some aspects, the first seal is installed in a gap between the edge of the switching material and the electrical connector.

In some aspects, the first seal is non-reactive with the switching material.

In some aspects, the first seal is gas-impermeable.

In some aspects, the first seal is water-impermeable.

In some aspects, the first seal and/or second seal is electrically insulating.

In some aspects, the first seal has low amount of electrical conductivity

In some aspects, the first seal is non-absorbing, or substantially non-absorbing of a solvent or plasticizer component of the layer of switching material.

In some aspects, the first seal comprises a polymer matrix comprising thermoplastic, thermosetting, or thermoplastic and thermosetting polymers.

In some aspects, the first seal is a thermoset material.

In some aspects, the first seal does not release water when curing.

In some aspects, the first, the second or the first and the second substrates each have a thickness of from about 1.0 to about 5 mm.

In some aspects, the second seal is non-reactive with the first seal.

The present disclosure also relates to a seal system for a switchable film. The seal system may further comprise a detection system for detecting a compromised seal component.

In accordance with another aspect, there is provided a seal system for a switchable film, the seal system comprising a first seal and a second seal, the first seal disposed along an edge of a switching material, separating the switching material from the second seal; the first seal, second seal, or first seal and second seal comprising an indicator material.

In some aspects, the seal system further comprises a trigger material.

In some aspects, the switching material comprises an indicator material or a trigger material, or both an indicator material and a trigger material.

In some aspects, the first seal comprises an indicator material and a trigger material.

In some aspects, the second seal comprises an indicator material and a trigger material.

In some aspects, the indicator material, trigger material or indicator material and trigger material may be encapsulated with an encapsulating material. The indicator material, trigger material or indicator material and trigger material may be encapsulated in layers.

This summary does not necessarily describe the entire scope of all aspects. Other aspects, features and advantages will become apparent to those of ordinary skill in the art upon review of the following description of specific embodiments.

BRIEF DESCRIPTION OF THE DRAWINGS

These and other features will become more apparent from the following description in which reference is made to the appended drawings wherein:

FIG. 3 shows a schematic diagram of the cut edges, busbar and electrical connectors for a film with offset edges, according to another embodiment.

FIG. 4 shows a schematic diagram of cut edges, bus bars and electrical connectors for a film with offset edges according to another embodiment.

DETAILED DESCRIPTION

Figure 1:
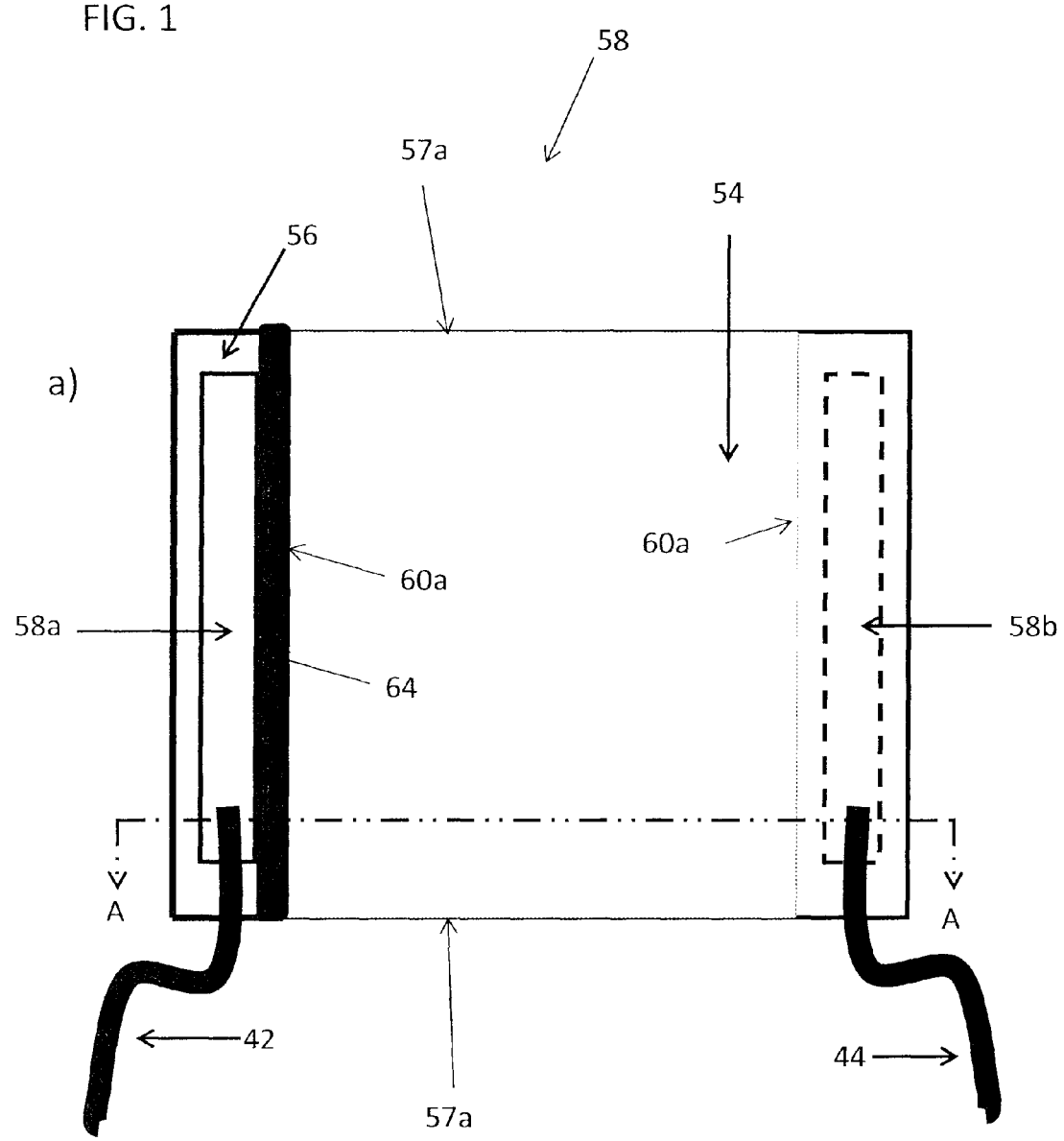
FIG. 1 shows a schematic diagram of a switchable film with opposing, offset edges, according to one embodiment.

In the description that follows, a number of terms are used extensively, the following definitions are provided to facilitate understanding of various aspects of the invention. Use of examples in the specification, including examples of terms, is for illustrative purposes only and is not intended to limit the scope and meaning of the embodiments of the invention herein.

This disclosure provides, in part, a sealed film comprising a first and a second substrate, a first and a second electrode disposed on the surface of at least one of the substrates; a switching material disposed between the first and second substrates and in contact with the first and second electrodes; and a first seal and a second seal, the first seal disposed along an edge of the switching material, separating the switching material from the second seal.

This disclosure further provides, in part, a system for sealing a switchable film comprising a first seal along an exposed edge of a switching material, and a second seal encapsulating the first seal.

The disclosure provides, in part, a seal for a switchable laminated glass comprising a first seal, adherent to a conductive metal oxide electrode and compatible with a switching material of the switchable laminated glass.

A seal, or a seal system, may be useful for an apparatus comprising a switching material which may be sensitive to oxygen, water or environmental contaminants. A seal may separate sections of switching materials in the same film or device. A seal may provide a border or barrier between cells or units of switching material, permitting their independent operation and switching. A switching material may be layered between first and second substrates, an edge seal may be provided along all, or substantially all edges. A portion of one or both substrates may be removed before installation of the seal. In some embodiments, sections of seal may subsequently be removed to allow for application of electrical connectors, or to facilitate installation of other components or refine the shape of the switching material. A seal may be useful to contain the switching material, or prevent egress of the switching material or component of the switching material from the device. A seal may be useful to isolate the switching material from an external environment.

When making a through-cut on a switchable film (comprising first and second substrates, transparent conductive layers, switching material and optionally other layers or components) with a mechanical cutter (scissors, knife or the like), the pressure applied to initiate the cut may compress a portion of the switchable film, distorting or displacing a layer of switchable film and enabling contact between the transparent conductive layers on the interior sides of the substrates. For some films, the layer of switching material is thin, and the transparent conductive layers brittle when cut—microscopic shards of conductive material created or released with use of a mechanical cutter may span across the cut edge of the switching material, enabling contact across the edge of the switching material. This contact, whether from compression of the switching material, spanning of the switching material by conductive shards, or other undesired contact may allow for electrical flow (when electricity is applied) bypassing the switchable film (creating an electrical short in the film) and the film may not switch uniformly, or at all. Use of a laser cutter avoids the application of force to the film when cutting, and reduces the pressure-contact of the transparent conductive layers. In some embodiments, cutting the first and second substrates to form offset edges, and removing a portion of the switching material provide a platform for mounting busbars separated from the cut edge of the switching material and directly on the transparent conductive layer on the interior side. The busbar may be positioned on the uncut substrate to provide a gap to receive a seal material along the cut edge of the switching material, thereby sealing the switching material, and physically separating the busbar from the switching material. Forming the busbar mounting platforms from the film itself allows for the manufacture of a switchable apparatus to be performed separately from preparation of the switchable film. The switchable film may be manufactured using roll to roll or other continuous or semi-continuous coating method. The final shape of the switchable device does not have to be considered when preparing the switchable film in bulk, as it can be cut to shape as needed, as described herein. This feature may be particularly useful when the switchable apparatus necessitates use of a non-regular shaped film, for example custom-sized glazings for buildings or vehicles, or custom shaped lenses or lens inserts for opthalmic devices.

A supporting liner that may absorb or deflect the laser is not required—in some embodiments, the switchable material itself may be suitably absorbing of the laser to allow laser cutting of a first substrate and transparent conductive layer, but prevent through-cutting of the laser to the second substrate and transparent conductive layer, the conductive layers may be only a few angstroms thick, to facilitate the desired transparency.

Figure 2:
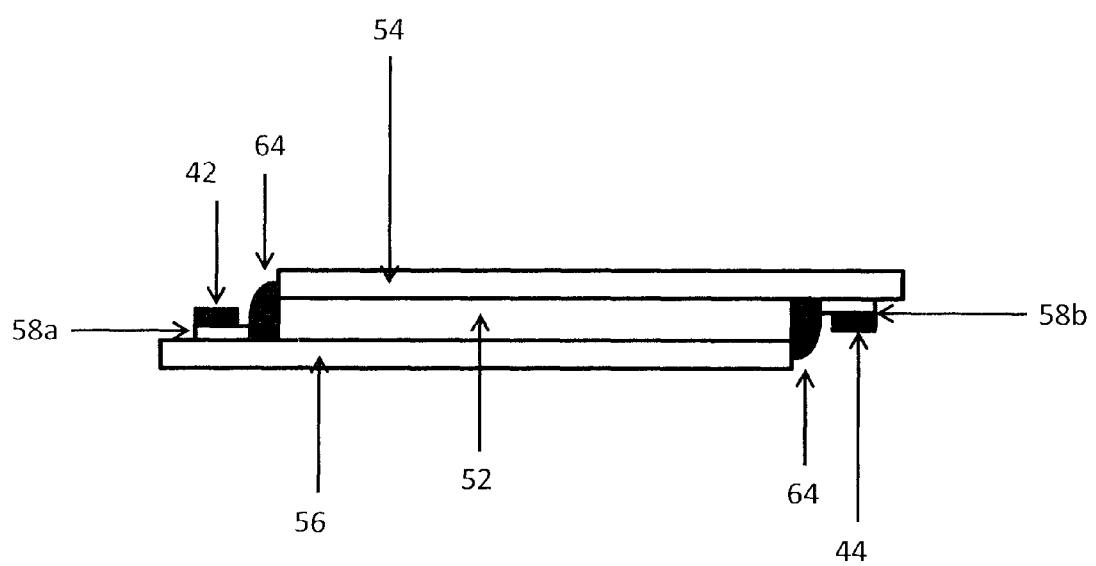
FIG. 2 shows a section view along line A-A of the switchable film of FIG. 1.

Referring to FIGS. 1 and 2, an apparatus according to another embodiment is shown generally at 58. Film 58 includes a layer of switching material 52 between first substrate 54 and second substrate 56 is electrically connected to electrical connectors 42, 44 via busbars 58a and 58b applied to a conductive coating (not shown) on substrates 54, 56; the conductive coating is in contact with switching material 52. A portion of substrates 54, 56 has been removed to expose the conductive coating where the busbars may be applied. First seal 64 is applied in a space 62 between busbar and switching material, adjacent to the cut edge of the switching material. First seal 64 may be in contact with switching material 52. First substrate 54 and second substrate 56 are offset along opposing sides 60a and 60b—this provides for access to the conductive surfaces to apply busbars and electrical connectors. For this embodiment—a generally rectangular-cut film—two sides have aligned edges 57a, 57b.

A seal may be applied along one or more edges of the switching material. A seal may be applied to a perimeter of the switchable layer before or after cutting to a desired size or shape. A seal may be applied by dispersing a bead, or applying a strip or die-cut section, of a sealing material along the periphery of the switching material. Other methods of dispersing or applying a sealing material such as extrusion, injection, spraying may also be used. The seal may isolate the switching material from other components of the laminated glass or optical filter, or from the ambient environment (e.g. air and/or moisture). The die-cut section may be a straight or curved strip, or a continuous shape (polygon, rounded, oval or irregular) to provide a continuous bound to the edge of the switching material.

Referring to FIG. 3, an apparatus according to another embodiment is shown generally at 87. First substrate 54 is offset along one edge 90 relative to second substrate 56; second substrate 56 of film 87 is inset along three edges 91, 92, 93, relative to first substrate 54. Offsetting of some or all edges of the substrate and conductive layer surrounding the switching material in a film, or a portion of the edges, and removal of the switching material along the cut edges provides a busbar mounting platform. This offset area may prevent inadvertent electrical contact between the conductive coatings of the first and second substrates which may short out the device, and may provide a larger surface area for the first, second or first and second sealing material to adhere to. Without an offset cut to form a busbar mounting platform, adhesion of a sealing material may be substantively dependent on the through-cut edge of the film—a substantially reduced surface area.

FIG. 4 shows an apparatus according to another embodiment. Film 89 has second substrate 56 inset along three edges, relative to substrate 54, with busbar 58a positioned on an offset edge adjacent to that of busbar 58b. Electrical connections 42, 44 lead to power source and/or control apparatus from the same corner of film 89. Electrical connections 42, 44 may be further embedded in an electrically insulating material (e.g. a seal) to prevent their inadvertent contact with a conductive coating of an opposing substrate. A first seal may be placed along the cut edge of the switching material, along the offset.

Other film shapes are contemplated, including curved, polygon or a combination thereof. In some embodiments, the shape of the film may be cut to resemble or match the shape of the switchable glazing or lens. For example, a triangular switchable glazing may comprise a triangular film, with two adjacent edges having opposing offsets, with busbars and positioned along the opposing offsets and electrical connectors leading from a common corner of the triangular film.

Figure 5A:
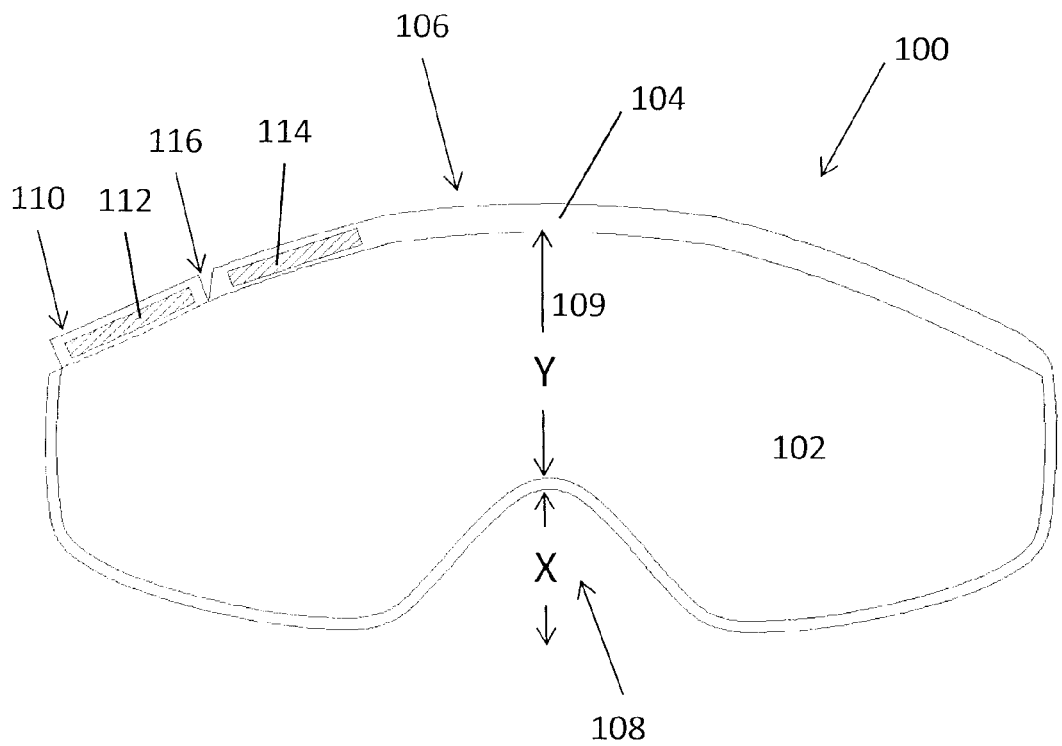
FIGS. 5A, B show schematic diagrams of a switchable film with offset edges cut to a shape, according to another embodiment.

In some embodiments, a film may be cut to a shape suitable for use in an opthalmic device. Referring to FIG. 5A, an apparatus according to another embodiment is shown generally at 100. Film 100 is cut to a general shape suitable for use as, or with, a goggle lens or similar opthalmic device. The lens 100 has an arc-shaped upper edge 106 and a lower edge with a cutout section 108 of height X for accommodating a user's nose, between lobed sections to cover the eyes of a user. The lens 100 may have a nose bridge section 109 of height Y, with an overall depth of the switchable area (from an upper edge to a bottom edge of the lens, inside the circumferential offset edges) of X+Y. The lens may be of unitary construction. Film 100 comprises a layer of switching material (not shown) is disposed between first substrate 102 and second substrate 104. First and second substrates have interior sides facing each other, and exterior sides facing away. The interior side of one or both substrates has a transparent conductive layer in contact with the layer of switching material. First substrate 102 is cut to have a smaller perimeter relative to substrate 104, providing a recessed section along a portion of the perimeter. An overhanging tab 110 provides a platform for mounting a busbar 112 on the interior side of substrate 102, in contact with the transparent conductive layer. Substrate 104 has a recessed section corresponding overhanging tab 110. Busbar 114 is mounted on the interior side of substrate 104, along a portion of an edge of substrate 104, and in contact with a conductive transparent layer on the interior side of substrate 104. Gap 116 separates the cut sections of substrates 102 and 104, providing non-overlapping mounting points for busbars 112, 114. Electrical connectors (not shown) may be mounted to busbars 112, 114 to connect the lens to a source of power to facilitate electrochromic switching of the lens. The offset edges of lens 100 may be sealed using a first, or a first and a second sealing material.

Lens 100 may be shaped to a cylindrical, spherical or frusto-conical configuration, and affixed to a frame using attachment points along a portion of the edge (not shown) or in a frame surrounding the periphery of the lens. Lens 100 may be thermoformed to conform to a spherical, or partially spherical lens shape. Lens 100, once shaped, may be laminated to a static plastic or glass opthalmic device using heat (melt lamination), or a heat or pressure activated adhesive, or combination thereof. In some embodiments, substrates 102, 104 may be rigid, or partially flexible plastic that may be formed into a suitable cylindrical, frusto-conical, spherical or partially spherical lens shape, and used in an opthalmic device without a second static glass or plastic lens.

Decreasing the depth of the nose bridge may generally increase the depth of the cutout section, making the first and second lobes of the lens more pronounced. By altering the height of the nose bridge and cutoff relative to each other (shifting the ratio X:Y), a lens with more or less flexibility about the nose bridge, a flatter profile, or more prominent profile may be formed.

The ratio of X:Y may be from about 1:10 to about 10:1 or any ratio therebetween, and may be selected according to the desired profile and shape of the lens. For example Y may be any percentage of the depth of the lens X+Y; Y may be from about 5% of X+Y to about 95% of X+Y, or any amount therebetween, for example about 10, 15, 20, 25, 30, 35, 40, 45, 50, 55, 60, 65, 70, 75, 80, 85 or 90%, or any amount or range therebetween.

For example, a lens for a ski goggle may have an X:Y ratio of from about 1:5 to about 1:1, whereas a unitary lens for sunglasses may have a smaller nose bridge, with an X:Y ratio of about 1:1 to about 5:1. It is appreciated however, that any suitable X:Y ratio may be used for ski goggles, sunglasses or any other type of unitary lens, without limitation.

Figure 5B:
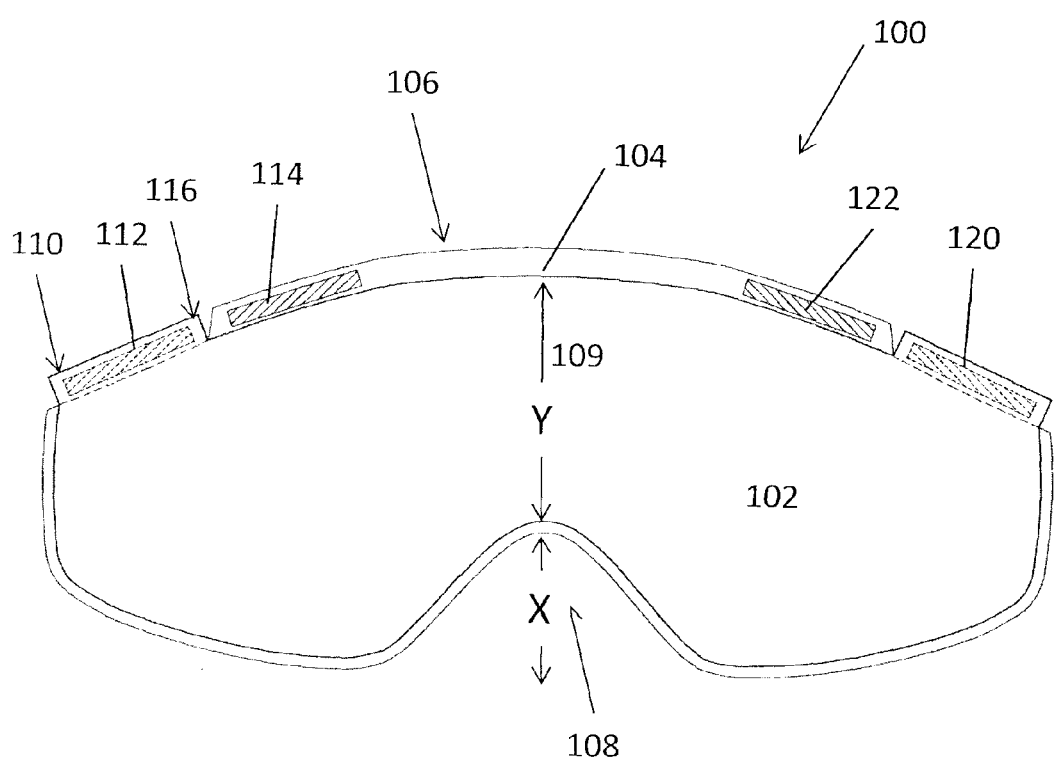

To electrochemically switch a lens according to some embodiments, an electrical potential is applied to the electrodes of the film 100 via busbars 112, 114, and the switching material switches. The relationship between the height of the nose bridge Y, and the area of the lens may, in part, impact the speed of the switch of the lens. Without wishing to be bound by theory, resistivity of the electrode may increase as the nose bridge decreases (Y is reduced and X increased). In some embodiments, a second pair of busbars 120, 122 may be included (FIG. 5B), with the electrical potential being applied to both pairs of busbars simultaneously. For large area lenses or lenses with a smaller nose bridge (e.g. where X:Y is from about 1:1, 2:1, 3:1, 4:1, or the like), inclusion of first and second pairs of busbars may allow for a faster switch.

The disclosure further provides, in part, a method for sealing a switchable film, comprising providing a switchable film comprising a first and a second substrate with a first and second electrode disposed on the surface of at least one of the substrates, and a switching material disposed between the first and second substrates and in contact with the first and second electrodes; disposing a first seal in contact with an electrode and adjacent to the switching material; and disposing a second seal adjacent to the first seal.

The disclosure further provides, in part, a method of cutting a switchable film, comprising the steps of providing a switchable film, directing laser radiation at the film to sever a weed portion comprising a portion of a first substrate, but not a second substrate of the switchable film, leaving the conductive layer of the second substrate intact.

To provide the offset edges, the film comprising a switchable layer may be kiss-cut with a laser. The laser is configured to cut only through the upper most substrate and conductive coating, without cutting through or damaging the conductive coating of the lower substrate—the switching material separates the two substrates. The penetrative power of the laser when cutting through the upper substrate may be absorbed or dissipated to below a threshold level, and may be further absorbed or dissipated by the layer of switching material. The penetrative power of the laser may be a product of the laser power (wattage), the type or source of the laser, whether the laser is a continuous or a pulsed beam, duration of the pulses, and the rate at which the laser is moved across the surface to be cut. In some embodiments, the laser may be a $CO_2$ laser; in some embodiments, the laser power may be from about 0.1 to about 5 W or any amount or range therebetween, or from about 0.5 to about 2 W, or any amount or range therebetween; in some embodiments, the laser may be pulsed at an interval of from 500 to about 2000 pulses per inch (PPI) or any amount or range therebetween, or from about 1200 to about 1800 PPI or any amount or range therebetween or from about 1400 to about 1600 PPI or any amount or range therebetween; in some embodiments the laser radiation may have a frequency of from about 9 to about 11 microns or any amount or range therebetween. Laser cutting may be performed under a nitrogen blanket. Pulsing the laser allows application of a substantially consistent amount of energy along a cutline; if insufficient energy is applied to make the cut, the weed portion may not separate cleanly and shorting may result. Guidance of the laser may be manual, or may be computer controlled, automated or semi-automated (e.g. CNC automation).

Kiss-cutting of the film with a laser may be advantageous over cutting with a knife or die—as the active layer of a switchable film may be very thin, any slivers or shards of conductive coating left along the edge after removal of the weed portion of the upper substrate and conductive coating may contact the lower conductive coating and cause an electrical short in the apparatus, and the active layer may fail to switch, or may switch unevenly or slowly.

The film may be cut in stages. In a first stage, the overall size and shape of the switchable area is defined, and an area of film slightly larger overall cut with flush edges (no offset). To cut a film as shown in FIG. 3, a first kiss-cut on substrate 54 is made, to provide edge 90. Additional kiss-cuts on substrate 56 may be made to provide edges 91, 92, 93. The cuts on substrate 56 may be continuous or separate, and depending on equipment configuration, the film may be turned over after the first kiss-cut, or a laser cutting head positioned underneath the film may be used. After the film is cut, weed portions are removed, and any switching material remaining on the uncut substrate is removed. The one or more cuts may be straight or curved. Where the substrate is a spun, cast, extruded or woven web, cuts may be at any angle relative to the direction of the web, including parallel, perpendicular or any angle therebetween Electrical connectors 58a, 58b may be placed on the conductive coating, for connection of the film to a power source; in the embodiment shown, electrical connectors 42, 44 are also provided.

Thus, the disclosure further provides, in part, a switchable film where the first and the second substrates are in an offset relationship along at least one edge, or along at least two edges. The at least two offset edges may be on different substrates, or on the same substrates. Where the at least two offset edges are on the same substrate, they may be adjacent (share a common corner or vertex).

A portion of a first seal is applied adjacent to the switching material along cut edges 90, 91, 92, 93—the first seal contacts the cut edge of the switching material and the conductive coating of the uncut substrate. Contact with the uncut surface may aid in maintaining the position of the first seal, to ensure a suitable seal for the switching material.

In some embodiments, support and separation of the substrates and their respective conductive coatings is provided by the switching material itself—a spacer, or the like, is not required to keep the conductive coatings from contacting and shorting. As the switching material may be cast or extruded as one or more layers on a first substrate, followed by application of the second substrate on top, there is no chamber defined in advance by the substrates and an edge configuration, which may be subsequently filled. Instead, the switching material may be set, cooled or cured to a suitable strength to maintain the separation of the conductive coatings and prevent shorting of the device, even following lamination with heat and pressure. Spacers, beads or other physical devices to maintain separation of the substrates and conductive coating are not needed. Additionally, the film may be produced in advance of knowing the final shape or configuration of the device in which it will be used, and until needed. Suitable shapes—flat or curved (e.g. lenses for helmets, visors, windows of any desired shape)— may later be cut from the film as needed.

The disclosure further provides, in part, an encapsulated switchable film comprising a layer of switching material between a pair of parallel substrates, and a first and a second conductive coating or layer (first and second electrode) disposed on a first surface of one or both substrates; a first seal surrounding the layer of switching material; first and second transparent layers affixed to a second surface of the substrate; a second seal disposed between the first and second transparent layers, and separated from the switching material by the first seal. In some embodiments, the switching material may be in contact with both the first and the second electrode.

The disclosure further provides, in part, a switchable film comprising: a layer of switching material between a pair of parallel substrates, the switching material in contact with a first and a second electrode disposed on a first surface of a substrate; a first seal surrounding the layer of switching material; first and second transparent layers affixed to a second surface of the substrate; a second seal disposed between the first and second transparent layers, and separated from the switching material by the first seal; with the proviso that no spacer is needed to prevent contact of the electrodes. The switchable film may be described as a "spacerless" switchable film.

The disclosure further provides, in part, a method for encapsulating a switchable film comprising: providing a switchable film; comprising a first and a second substrate with a first and second electrode disposed on the surface of at least one of the substrates, and a switching material disposed between the first and second substrates and in contact with the first and second electrodes; disposing a first seal in contact with an electrode and adjacent to the switching material; affixing a transparent layer to the first and second substrates; and disposing a second seal adjacent to the first seal, the second seal separated from the switching material by the first seal.

Figure 6:
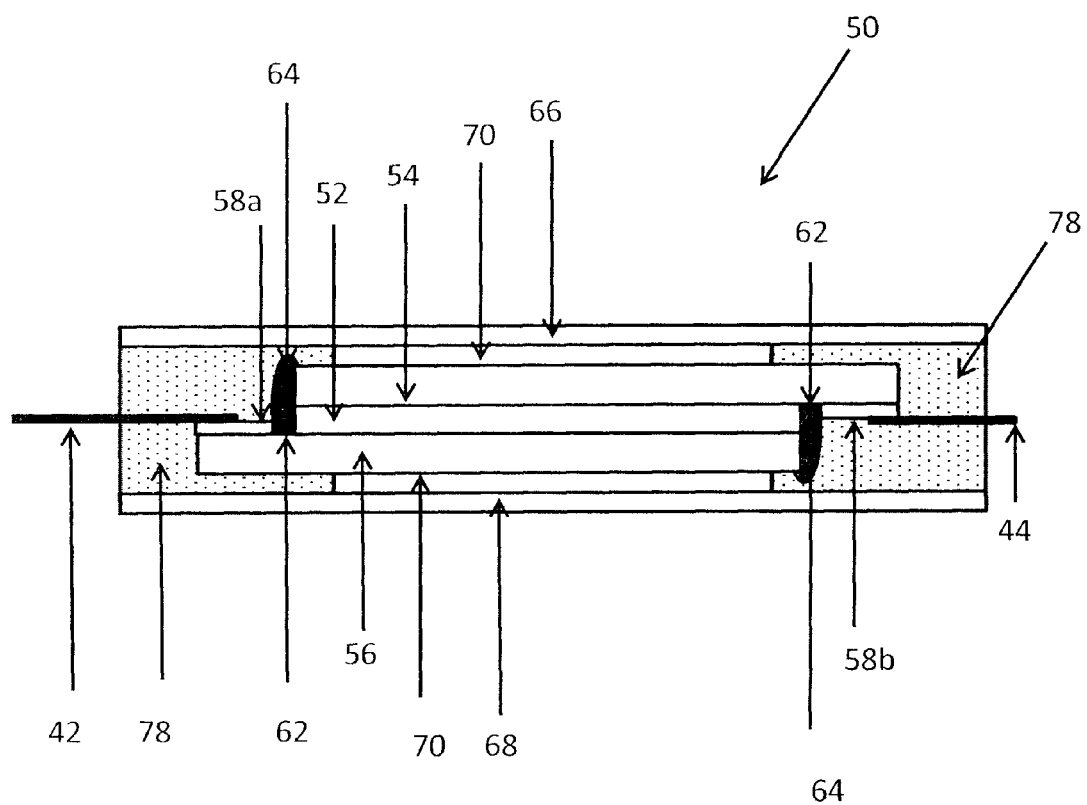
FIG. 6 shows a sectional diagram of the cut edges, busbar and electrical connectors for an encapsulated film with offset edges according to another embodiment.

Referring to FIG. 6 an apparatus of an embodiment is shown generally at 50. A layer of switching material 52 between first 54 and second 56 substrates is electrically connected to electrical connectors 42, 44 via busbars 58a, 58b in contact with a conductive coating (not shown) on substrates 54, 56; the conductive coating is in contact with the switching material 52. A portion of substrates 54, 56 has been removed to expose the conductive coating where the busbars may be applied. The first seal 64 is applied in a space 62 between the busbar and switching material, adjacent to the cut edge of the switching material. First seal may be in contact with the switching material. A second seal 78 may be disposed in a space defined in part by the first and second transparent layers 66, 68 and first seal 64, encapsulating the first seal, busbar and electrical connector. The second seal is not contacted by the switching material; this is prevented by the first seal. Transparent layers 66, 68 may be affixed to substrates 54, 56 by an adhesive 70. The adhesive 70 may be a layer of pressure-sensitive adhesive or a sheet material. The adhesive 70 may be pre-cut (die cut, laser cut or other suitable cutting method) to a suitable shape for the switchable film and offset edges, before incorporation into the apparatus. The second seal may be a separate application of the same material as the first seal, or may be a different seal.

The disclosure further provides, in part, a method for encapsulating a switchable film comprising: providing a switchable film; comprising a first and a second substrate with a first and second electrode disposed on the surface of at least one of the substrates, and a switching material disposed between the first and second substrates and in contact with the first and second electrodes; affixing a transparent layer to the first and second substrates; and disposing a first seal in a space defined at least in part by a kiss-cut edge of the switchable film and the transparent layers affixed to the first and second substrates.

Figure 7:
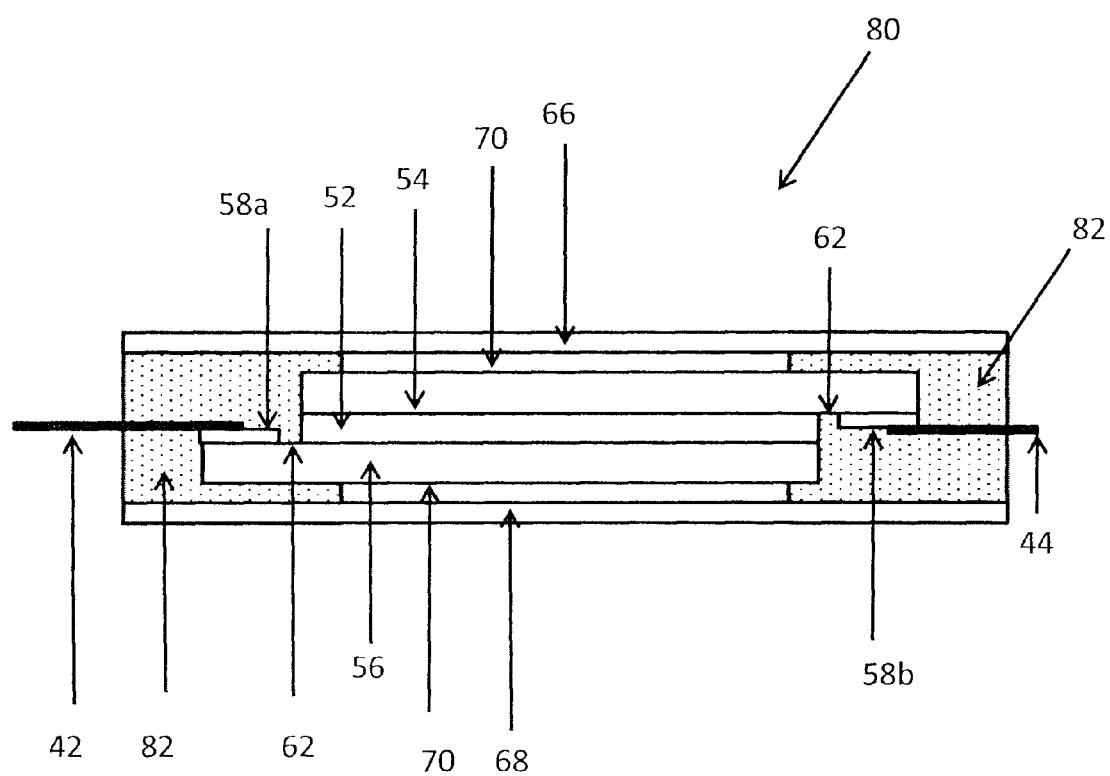
FIG. 7 shows a sectional diagram of the cut edges, busbar and electrical connectors for an encapsulated film with offset edges, according to another embodiment.

Referring to FIG. 7, an apparatus according to another embodiment is shown generally at 80. A seal 82 is applied in a space defined in part by the first and second transparent layers 66, 68, and an edge of the switching material 52, filling the space 62 and encapsulating the busbars 58*a*, 58*b* and electrical connectors 42, 44. In this embodiment, there is no first seal preventing contact of the switching material by the seal 82.

In another embodiment, the second seal may comprise a component that interacts with a component in a switching material, creating a detectable change that identifies a deficiency in the first seal—a leak, gap or the like. Where the first seal is intact and prevents contact of the switching material by the second seal, the second seal cures to isolate the switching material from the external environment. The first seal may absorb a portion of the switching material, but prevent contact of one or more components of the active layer and second seal long enough for the second seal to complete curing or hardening. Where there is a deficiency in the first seal, the uncured or partially cured second seal may contact the switching material. When this occurs, an observable alteration such as a color change may result. This observable alteration may be due to an indicator in the switching material, the second seal or both. Detection of a faulty seal early in the manufacture process may allow for defective films or devices to be identified and if appropriate, removed from the production process, to reduce the number of defective devices in the final product lot. In other embodiments, the indicator of the cured second seal may be activated if the first seal is breached—for example, if the switchable film, or a device comprising the switchable film is twisted or physically damaged. A change in color or other visible indicator draws attention to the damaged device.

In another embodiment, the seal system may comprise one or more indicators for indicating a deficiency in the first seal, the second seal, or both the first seal and the second seal. A breach or other deficiency in a seal may result in a product comprising a material that is less durable, or potentially adversely affected by the external environment. Examples of such materials include switchable materials, active layers, suspended particle layers, liquid crystal, photovoltaic materials or the like. In some of the embodiments that follow, a switchable material or active layer is exemplified, however any other material adversely affected by a breach in the seal—by ingress of a seal system component or environment interaction (e.g. water, air, oxygen, etc), or by egress of a component of the material (e.g. loss, disruption or inactivation of a component of the material) may benefit from a seal system and/or an indicator system as described herein.

Figure 8:
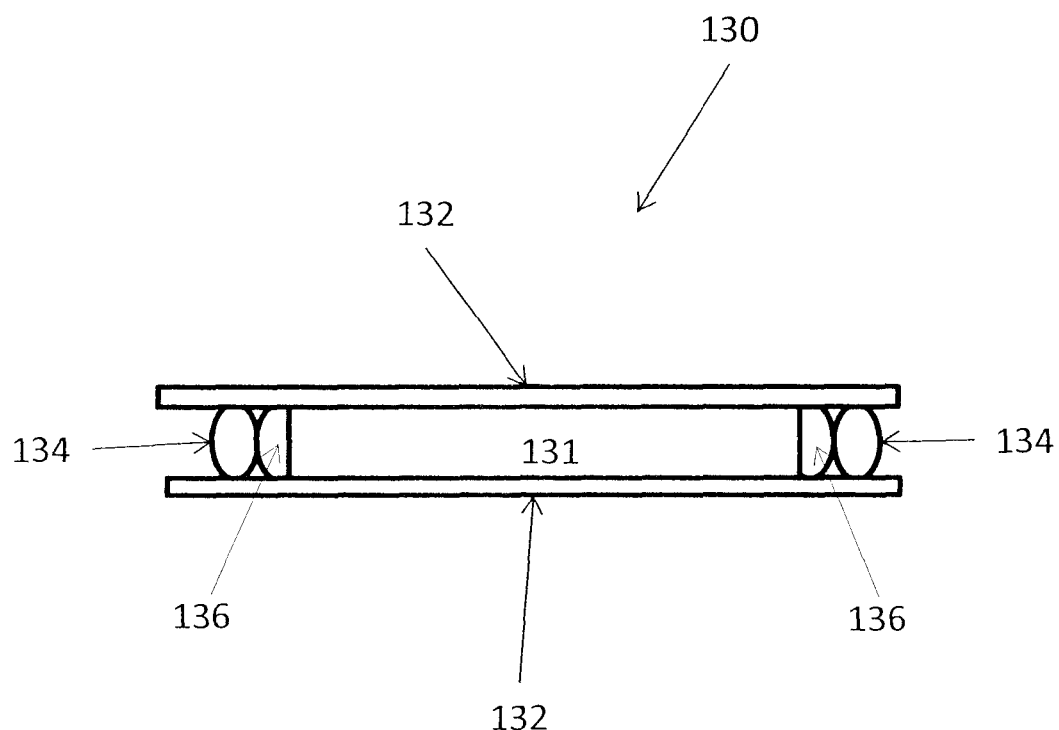
FIG. 8 shows a sectional diagram of a portion of a switchable film comprising an active layer and first and second seal materials, according to another embodiment.

Referring to FIG. 8, a schematic diagram of a switchable film with first and second seals is shown generally at 130. Active layer 131 is disposed between substrates 132. Substrate 132 may include a conductive layer (not shown). In one embodiment, active layer 131 comprises an indicator material and second seal 134 comprises a trigger material. In another embodiment, active layer 131 comprises a trigger material and second seal 134 comprises an indicator material. Where first seal 136 fails, interaction of the indicator material and trigger material may be permitted, and a detectable change occurs.

In another embodiment, first seal 136 comprises an indicator material, and a trigger material is a component of the external environment. Where the second seal 134 fails, interaction of the indicator material and trigger material is permitted, and a detectable change occurs.

Figure 9:
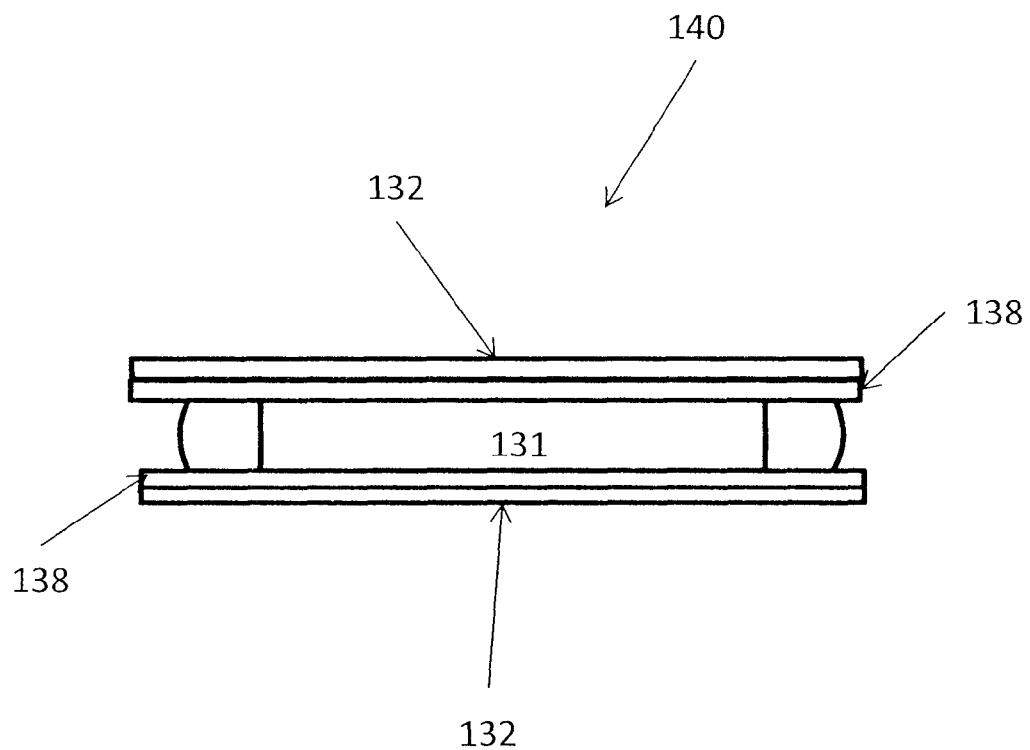
FIG. 9 shows a sectional diagram of a portion of a switchable film comprising an active layer and indicator layers, according to another embodiment.

Referring to FIG. 9, a schematic diagram of a switchable film with first and second seals is shown generally at 140. Active layer 131 is disposed between substrates 132 and layer 138. Substrate 132 may include a conductive layer (not shown). In one embodiment, active layer 131 comprises an indicator material and substrate 132 comprises a trigger material. In another embodiment, active layer 131 comprises a trigger material, and substrate 132 comprises an indicator. Active layer 131 and substrate 132 are separated by layer 138—where the integrity of layer 138 fails or otherwise allows contact of substrate 132 with active layer 131, interaction of the indicator material and trigger material is permitted, and a detectable change occurs.

In another embodiment, substrate 132 comprises an indicator material and a trigger material is a component of the external environment. Where substrate 132 fails, or otherwise allows contact of layer 138 with the external environment, interaction of the indicator material and trigger material is permitted and a detectable change occurs.

For clarity, the embodiments of FIGS. 8 and 9 are shown as separate diagrams; it is contemplated that a switchable film or switchable device may incorporate both the seal configuration like that of FIG. 8, and the layer configuration like that of FIG. 9. In an embodiment comprising both, active layer 131 may comprise an indicator, and substrate 132 and second seal 134 each comprise a trigger material; the trigger material may be the same or different. In another embodiment, active layer 131 may comprise a trigger, ad substrate 132 and second seal 134 each comprise an indicator material; the indicator material may be the same or different. In another embodiment, the first seal 136 and layer 138 may each comprise an indicator material, the indicator material may be the same or different, and the trigger may be a component of the external environment.

An indicator material or a trigger material may be mixed in, coated on, or dispersed through a seal, substrate, layer or active layer. The indicator material or trigger material may be soluble in the seal, substrate, layer or active layer; the indicator material or trigger material may be encapsulated. In one embodiment, the indicator material is encapsulated and the trigger material disrupts the encapsulating material to release the indicator. Reaction of the indicator material with a component of the seal, substrate, layer or active layer may effect a detectable change. In some embodiments, the seal, substrate, layer or active layer may comprise a second trigger material to interact with the indicator material to effect the detectable change.

A detectable change may be a colour change. An example of an indicator material may be a dye molecule or dye molecule precursor. A dye molecule may undergo a permanent or temporary change from a first colored state to a second colored state. A dye molecule precursor may interact with a trigger material and be cleaved, or undergo a chemical reaction (reversible or irreversible) with the trigger material, and change from a first colored state to a second colored state. A first colored state and a second colored state may each independently be any color, or may be fluorescent, or may be colourless or substantially colourless.

In some embodiments, the detectable change may be a change in solubility of an indicator material, where contact of the indicator material and trigger material induces precipitation of the indicator material, changing the optical clarity, or light transmittance of the indicator material, or device component (e.g. substrate, layer, seal or active layer) comprising the indicator material.

In another embodiment, the indicator material and trigger material may be encapsulated in layered microcapsules, where the material used for encapsulation maintains the indicator and trigger in separate compartments. The material for encapsulation may be solubilized or otherwise disrupted by a component of the active layer e.g. a solvent or plasticizer. The encapsulated indicator and trigger materials may be incorporated into the second seal material—when the first seal is compromised, the indicator and trigger are released by interaction with the component of the active layer and a detectable change may be observed. Such an embodiment may be advantageous in that no additional materials are added to the active layer, minimizing the complexity of the active layer formulation.

Where the active layer is switchable between light and dark states with a reduction or oxidation event, inclusion of a redox indicator, or an oxidant or reductant as an indicator material in a first or a second seal material may be useful. In another embodiment, the redox indicator or oxidant or reductant may be incorporated into the second seal material—when the first seal is compromised, the indicator undergoes oxidation or reduction and a detectable change may be observed. The indicator material may be encapsulated, and the material used for encapsulation may be solubilized or otherwise disrupted by a component of the active layer. The indicator material, trigger material, or both indicator and trigger material may be dispersed in one or more carrier fluids, as a dispersion, suspension or emulsion, or dissolved in a carrier fluid. Where the indicator and/or trigger material is encapsulated, the carrier fluid may be compatible (non-disruptive) of the encapsulating material.

Examples of dyes or dye precursors include redox indicators, halochromic indicators, inorganic oxidants or reductants. Examples of inorganic oxidants or reductants include potassium permanganate and potassium dichromate. Redox indicators may be pH dependent, or pH independent. Examples of redox indicators are set out in Table 1:

TABLE 1

| Redox indicators | | | |
|---|---|---|---|
| Indicator | $E^0$, V | $E^0$, V at pH = 0 | $E^0$, V at ph = 7 |
| (pH independent) | | | |
| 2,2'-bipyridine (Ru complex) | +1.33 V | | |
| Nitrophenanthroline (Fe complex) | +1.25 V | | |
| N-Phenylanthranilic acid | +1.08 V | | |

TABLE 1-continued

| Redox indicators | | | |
|---|---|---|---|
| Indicator | $E^0$, V | $E^0$, V at pH = 0 | $E^0$, V at ph = 7 |
| 1,10-Phenanthroline iron(II) sulfate complex | +1.06 V | | |
| N-Ethoxychrysoidine | +1.00 V | | |
| 2,2'-Bipyridine (Fe complex) | +0.97 V | | |
| 5,6-Dimethylphenanthroline (Fe complex) | +0.97 V | | |
| o-Dianisidine | +0.85 V | | |
| Sodium diphenylamine sulfonate | +0.84 V | | |
| Diphenylbenzidine | +0.76 V | | |
| Diphenylamine | +0.76 V | | |
| Viologen (pH dependent) | −0.43 V | | |
| Sodium 2,6-dibromophenol-indophenol | | +0.64 V | +0.22.V |
| Sodium o-Cresol indophenol | | +0.62 V | +0.19 V |
| Thionine | | +0.56 V | +0.06 V |
| Methylene blue | | +0.53 V | +0.01 V |
| Indigotetrasulfonic acid | | +0.37 V | −0.05 V |
| Indigotrisulfonic acid | | +0.33 V | −0.08 V |
| Indigo carmine | | +0.29 V | −0.13 V |
| Indigomono sulfonic acid | | +0.26 V | −0.16 V |
| Phenosafranin | | +0.28 V | −0.25 V |
| Safranin T | | +0.24 V | −0.29 V |
| Neutral red | | +0.24 V | −0.33 V |

Examples of halochromic indicators include leuco dyes; some examples of halochromic indicators may include gentian violet (methyl violet 10b) (transition pH range 0.0-2.0), malachite green (first transition pH 0.0-2.0), malachite green (second transition pH 11.6-14), thymol blue (first transition pH1.2-2.8), thymol blue (second transition pH 8.0-9.6), methyl yellow (pH 2.9-4.0), bromophenol blue (pH 3.0-4.6), congo red (pH 3.0-5.0), methyl orange (pH 3.1-4.4), screened methyl orange (first transition pH 0.0-3.2), screened methyl orange (second transition pH 3.2-4.2), bromocresol green (pH 3.8-5.4), methyl red (pH 4.4-6.2), azolitmin (pH 4.5-8.3), bromocresol purple (pH 5.2-6.8), bromothymol blue (pH 6.0-7.6), phenol red (pH 6.4-8.0), neutral red (pH 6.8-8.0), naphtholphthalein (pH 7.3-8.7), cresol red (pH 7.2-8.8), cresolphthalein (pH 8.2-9.8), phenolphthalein (pH 8.3-10.0), thymolphthalein (pH 9.3-10.5), alizarine yellow R (pH10.2-12.0).

Examples of trigger materials include those that may effect a pH change in a local environment (e.g. acids or bases); a pH change may trigger a color change in a halochromic indicator. Examples of trigger materials include propionic acid, butyric acid, valeric acid, caproic acid, caprylic acid, capric acid, lauric acid, myristic acid, palmitic acid, stearic acid, cyclohexanoic acid, phenylacetic acid, benzoic acid, toluic acid, chlorobenzoic acid, bromobenzoic acid, nitrobenzoic acid, phthalic acid, isophthalic acid, terephthalic acid, salicylic acid, hydroxybenzoic acid and aminobenzoic acid, or the like.

Examples of materials that may be used to encapsulate indicator materials or trigger materials include Acrylonitrile-Butadiene-Styrene Copolymer, Acrylonitrile-Methyl acrylate copolymer, acylonitrile-styrene-acrylate copolymer, amorphous nylon, arabinogalacatan, beeswax, carboxymethylcellulose, carnauba, cellulose, cellulose acetate phthalate, cellulose nitrate, cyclic olefin copolymer, epoxy resin, ethylcellulose, ethylene, ethylene-chlorotrifluoroethylene copolymer, ethylene-tetrafluoroethylene copolymer, ethylene-vinyl acetate copolymer, ethylene-vinyl alcohol copolymer, fluorinated ethylene-propylene copolymer, stearyl alcohol, gelatin, glyceryl stearate, glycol modified polycyclohexylenedimethylene terephthalate, gum arabic, hexafluoropropylene, hydroxyethylcellulose, ionomer, liquid crystal polymer, methylcellulose, nylon, polyvinylpyrrolidone, paraffin, paraffin wax, perfluoroalkoxy resin, poly (lactide-co-glycolide), polyacrylic acid, polyamide, polyamide, polyamide-imide, polyarlysulfone, polyaryletheretherketone, polyaryletherketone, polybutylene, polybutylene terephthalate, polycarbonate, polychlorotrifluoroethylene, polycyclohexylenedimethylene ethylene terephthalate, polyester, polyethelyene vinyl acetate, polyetherimide, polyethersuflone, polyethylene, polyethylene naphthalate, polyethylene terephthalate polyethylene/polystyrene alloy, polyethylene-acrylic acid copolymer, polyimide, polymethacrylate, polyolefin plastomers, polyoxymethylene, polyparaxylylene, polyphenylene sulfide, polyphthalamide, polypropylene, polystyrene, polysulfone, polytetrafluoroethylene, polyurea, polyurethane, polyvinyl alcohol, polyvinyl chloride, polyvinyl fluoride, polyvinylidene chloride, shellac, starch, stearic acid, styrene-acrylate, styrene-acrylonitile copolymer, styrene-butadiene block copolymer, styrene-methacrylate, tetrafluoroethylene, urea-formaldehyde resin, vinylidene fluoride terpolymer, zein, latexes, polyacetal, polyacrylate, polyacrylic, polyacrylonitrile, polyamide, polyaryletherketonc, polybutadiene, polybutylene, polybutylene terephthalate, polychloroprene, poly ethylene, polyethylene terephthalate, polycyclohexylene dimethylene terephthalate, polycarbonate, polychloroprene, polyhydroxyalkanoate, polyketone, polyester, polyethylene, polyetherimide, polyethersulfone, polyethylenechlorinates, polyimide, polyisoprene, polylactic acid, polymethylpentene, polyphenylene oxide, polyphenylene sulfide, polyphthalamide, polypropylene, polystyrene, polysulfone, polyvinyl acetate, polyvinyl chloride, as well as polymers or copolymers based on acrylonitrile-butadiene, cellulose acetate, ethylene-vinyl acetate, ethylene vinyl alcohol, styrene-butadiene, vinyl acetate-ethylene, and mixtures thereof, or the like.

A trigger material of an external environment may include a material that 'poisons' the switching action of the active material. For switching materials that involve a reduction or oxidation event (e.g. diarylethenes, viologens, phenazines) a material that injects or scavenges electrons may disrupt the reductive or oxidative switch—slowing it down or stopping it altogether. For switching materials that involve migration of an ionic species across, or into or out of, a layer, disruption of the movement of the ionic species may disrupt the switch—slowing it down or stopping it altogether. In other embodiments, the poison may disrupt polymerization of a switching material—preventing it from completing, or inducing undesirable polymerization. In some embodiments, the trigger material from the external environment may include ambient air, or a gas, or a component thereof, e.g. carbon dioxide, oxygen, $H_2S$, water, or other material in the environment external to the active layer. Examples of indicator materials that undergo a detectable change with exposure to water include cobalt (II) chloride, copper (II) sulfate. In some embodiments, the indicator material may be incorporated in a first seal, when the second seal is compromised, water, water vapor or air from the external environment may interact with the indicator material to induce a detectable colour change.

In some embodiments, the indicator material may be responsive to oxygen, and oxygen may be a trigger material. The indicator material may be included in the first seal, and if the second seal is compromised, oxygen in the external environment may interact with the indicator material to provide a detectable change. U.S. Pat. No. 8,647,876 (incorporated herein by reference) discloses several indicator materials that may undergo a colour change, or become chemiluminescent, when exposed to oxygen.

In some embodiments, a first seal may comprise an indicator material and a trigger material may be encapsulated in a layered microcapsule, and the encapsulating material may be water soluble. When the second seal is compromised, water or water vapor from the external environment may disrupt the encapsulation, allowing interaction of the indicator and trigger, providing a detectable change. Examples of water soluble encapsulating materials may include gelatin, gum arabic, starch, polyvinylpyrrolidone, carboxymethylcellulose, hydroxyethylcellulose, methylcellulose, arabinogalacan, polyvinyl alcohol, polyacrylic acid, or a combination thereof, or the like.

In an embodiment, the switching material may include an indicator material; the indicator material may be a diarylethene, and the second seal may include a trigger material; the second seal may be a two-part epoxy, such as that described in U.S. Pat. No. 6,248,204 (incorporated by reference herein), and the trigger material may be an epoxy resin an epoxy resin hardener or both an epoxy resin and an epoxy resin hardener.

Lamination:

A switchable film may be further laminated with heat and pressure between layers of glass, to provide a switchable, laminated glazing. The disclosure further provides, in part, a laminated glass comprising: a switchable film; an electrical connector for electrically connecting the first and the second electrodes to a power source; and a first seal contacting an edge of the layer of switching material. The switchable film may be an encapsulated switchable film.

The switchable film may be layered between layers of PVB, and this between first and second layers of glass. For lamination, the glass-PVB-switchable film-PVB-glass sandwich may be passed through a press roll, pressed between plates at an elevated temperature (about 90° C. to about 140° C.—pressure and temperature may be increased and decreased over several steps), or may be placed in a vacuum bag (rubber), with an initial bonding at a temperature of about 70° C.-110° C., while applying a vacuum to remove air between the layers. A second bonding step may then be performed at a temperature of about 120° C.-150° C., with pressure (e.g. about 0.95 MPa to about 1.5 MPa in an autoclave). The overall thickness of the laminated glass is dependent, in part on the thickness of the various layers. Laminated glass may have advantages for strength, safety, impact resistance, reduction in noise or the like), and inclusion of a switchable compound provides additional, advantageous features over conventional laminated glass. A switchable film is "laminatable" if it retains the ability to fade and darken after lamination.

A seal for a switchable film or used in a device comprising a switchable film prevents ingress of matter that may affect performance of the switching material. Where a switching material is self-supporting, support or separation devices such as spacers, beads, dividers or the like are not needed in the seal. Where the switching material is part of a film that is to be laminated between rigid substrates (e.g. using heat and pressure such as for a laminated glass), it may be advantageous to use seals that are compressible, to prevent breakage of the glass during lamination.

Seals may be a thermoplastic, a thermoset, a rubber, a polymer or metal, a metallized tape, or combinations thereof. A seal may be selected to provide good adhesion to contacted surfaces (substrate, conductive layer, electrode, switching material, electrical connectors or the like, and to provide sufficient flexibility, barrier properties, mechanical durability and adhesion at the operating temperature of the switchable layer to maintain the isolation of the switching material—for example, a seal may be selected that does not crack or crumble, break down, or lose adhesion as the temperature changes. A seal may not interact with the switching material, or "poison" or interfere with the photochemistry and electrochemical performance of the switching material. A seal may be electrically insulating. A seal may be gas-impermeable. A seal may be resistant to water, or may be water impermeable. A seal may comprise a dessicant to scavenge any residual water that may be present. Examples of dessicants include zeolites, activated alumina, silica gel, calcium sulfate, calcium chloride, calcium bromide and lithium chloride, alkaline earth oxide, potassium carbonate, copper sulfate, zinc chloride or zinc bromide. A dessicant may be dispersed in a seal, or applied to a surface of a seal.

Thermoset materials include polymers, rubbers and plastics. Examples of thermoset seals include polymers with reactive groups. Examples of polymers may include silicones and siloxanes. Examples of reactive groups include vinyl groups, hydride groups, silanol groups, alkoxy or alkoxide groups, amine groups, epoxy groups, carbinol (polyester or polyurethane groups), methacrylate or acrylate groups, mercapto (thiol, polythiol groups), acetoxy, chlorine or dimethylamine groups. Curing or hardening of such materials may be chemical, radiation, temperature or moisture dependent. Examples of radiation curing may include exposure to light (UV light or visible light); examples of temperature curing may include resting the material at an elevated temperature; examples of chemical curing may include a condensation reaction, an addition reaction, vulcanization, or the like. The chemical curing may include a catalyst, or addition of a reactive group to facilitate cross-linking of a polymer. The chemical cure may further be heated to accelerate the curing reaction, or may be cooled to retard the curing reaction.

For example, vinyl functional polymers may be employed in an addition cure system (e.g. Pt catalyzed); hydride functional polymers may be employed in an addition cure system; siloxane functional polymers may be employed in a condensation cure system (e.g. silicones with one part or two part room temperature vulcanization (RTV)), or an acetoxy, enoxy, oxime, alkoxy or amine moisture-cure system.

Thermoplastic materials may include polymers, rubbers and plastics that melt or flow at elevated temperatures, and reversibly set to a non-flowing state at a reduced temperature. Examples of thermoplastic materials include poly(vinyl alcohol), poly(vinylidene chloride), polyvinylidene fluoride, ethylene vinyl acetate (EVA), and polyvinyl butyral (PVB), Examples of rubbers include polyisoprene, polyisobutylene (PIB), poly(isobutylene-co-isoprene), block, copolymer and graft polymer of butadiene-styrene, poly(chlorobutadiene), poly(butadiene-co-acrylonitrile), poly(isobutylene-co-butadiene), acrylate-ethylene containing copolymer rubber, poly (ethylene-co-propylene), poly(ethylene-co-butene), ethylene-propylene-styrene copolymer rubber, polystyrene-co-isoprene), poly(styrene-co-butylene), styrene-ethylene-propylene copolymer rubber, perfluorinated rubber, fluorinated rubber, chloroprene rubber, silicone rubber, ethylene-propylene-nonconjugated diene copolymer rubber, thiol rubber, polysulfide rubber, polyurethane rubber, polyether rubber (such as polypropylene oxide), epichlorohydrin rubber, polyester elastomer, alpha olefin polymer, and polyamide elastomer.

A seal overlaid with a metal layer or metal foil or tape may be a useful edge seal system.

Examples of epoxy seal materials include DP100, DP105, DP110, DP125 from 3M; 1C, E-30-CL, M-31 CL from Hysol; EP415S-IHT from MasterBond, Delo LP655. Examples of silicone seal materials include Sylgard182, RTV3165, RTV791, RTV9-1363, RTV948 from Dow; or SWS, SCS2000, RTV102, RTV6700 or RTV11 from Momentive, RGS7730, HM2500, CAF520 (Blustar); PV8303, RTV791, RTV730, RTV795 from Dow; SCS2000 from Momentive. Examples of polyurethane seal materials include Titebond MP75 HiPURformer, 3M Scotch-Weld DP605 NS, Lord 6650, Hysol U09FL, Examples of acrylic seal materials include Tremflex 834. 3M 8211, 3M 8172PCL, Surlyn 1601, Surlyn 1703. Examples of ethyl vinyl acetate seal material include EVASAFE (Bridgestone), 3M Scotch-Weld 3764, 3M Scotch-Weld 3792. Examples of olefin polymer (polyolefin) seal materials include 3M Scotch-Weld 3748. Examples of polysulfide seals include THIOKOL. Examples of polyethylene seal materials include silane-crosslinked polyethylene (Solvay). Examples of isobutylene rubber seal materials include OppanolB15, OppanolB50, OppanolB12, OppanolB10 from BASF, Tremco 440, HL-5140 (HB Fuller), Poly(isobutylene-co-isoprene) from Scientific Polymer.

Some isobutylene seal materials comprise polyisobutene (polyisobutylene).

Some ethyl vinyl acetate seal materials may comprise ethylene-vinyl acetate polymer (55-75$ by weight and hydrocarbon resin (25-45% by weight). Some ethyl vinyl acetate seal materials may comprise ethylene-vinyl acetate polymer (50-65% by weight), hydrocarbon resin (25-35% by weight), polyethylene polymer (5-10% by weight), polyolefin wax 91-5% by weight) and an antioxidant (0.5-1.5% by weight).

Some polyolefin polymer seal materials may comprise polypropylene (15-40% by weight), hydrocarbon resin (10-30% by weight), styrene-butadiene polymer (10-30% by weight), ethylene-propylene polymer (5-25% by weight), polyethylene (5-20% by weight) and polyolefin wax (7-13% by weight).

In some embodiments, the seal may swell; swelling may occur during curing (for seals that are cured), or may swell after installation by absorption of a component of the switching material. For some embodiments, this may be advantageous in instilling the sealing material into small gaps or separations.

Sealing materials may be tested by immersion of a sample in a solvent and observed periodically for swelling, loss of mass, degradation, crumbling or other indicator of interaction with the solvent or components dissolved in the solvent. In some embodiments, some degree of swelling may be advantageous in a sealing material, in that the sealing material may expand to fill any gaps or spaces after installation. Sealing materials may also be tested by sealing a layer of switching material between substrates in a device. Devices with a single seal may be weighed (determine initial mass) and placed in an oven, and periodically weighed to assess any loss in mass—a loss in mass may be indicative of a sealing material that is not impermeable to the solvent or plasticizer or other component of the switching material. Devices may be further examined for the initial and ability to photochemically and/or electrochemically transition the switching material from a dark state to a faded state, or from a faded state to a dark state. During and after switching, the devices may be inspected for visual defects—uneven switching, development of spots, bubbles or other defects, or the like.

Where the plasticizer comprises triglyme, some examples of first seals may include: silicones (e.g. Sylgard182, RTV3165, RTV791, RTV9-1363, RTV948 from Dow; or SWS, SCS2000, RTV102 or RTV11 from Momentive), or isobutylene rubbers (e.g. polyisobutylene).

Where the plasticizer comprises 2,2,4-trimethyl-1,3-pentanediol monoisobutyrate, some examples of first seals may include: silicones (e.g. RGS7730, HM2500, CAF520 (Blustar); PV8303, RTV791, RTV730, RTV795 from Dow; SCS2000 from Momentive), some epoxies (e.g. DP110 from 3M), polyisobutylene rubbers (e.g. OppanolB15, OppanolB50, OppanolB12, OppanolB10 from BASF), or polysulfides.

Where the plasticizer comprises dimethyl-2-methyl glutarate, some examples of first seals may include: silicones (e.g. Sylgard 182, RTV791 from Dow; RTV102, RTV106, RTV6700, SCS2000 from Momentive; SCS9000, RTV100); polyisobutylene rubbers (e.g. OppanolB15, OppanolB50, OppanolB12, OppanolB10 from BASF); poly(isobutylene-co-isoprene rubber).

Where the plasticizer comprises diethyl succinate, some examples of first seals may include: silicones (e.g. Sylgard 182, RTV791 from Dow; RTV102, RTV106, RTV6700, SCS2000 from Momentive), polyisobutylene rubbers (e.g. OppanolB15, OppanolB50, OppanolB12, OppanolB10 from BASF).

Where the plasticizer comprises 2-(2-butyoxyethoxy) ethyl acetate, some examples of first seals may include: epoxies, silicones (e.g. Sylgard 182, RTV791, RTV730 from Dow; SCS2000, RTV6700 from Momentive), or polyisobutylene rubbers (e.g. OppanolB15 from BASF).

In some embodiments, the first seal may be a temporary barrier, separating the switching material from a second seal. The first seal may swell or absorb plasticizer or other component from the switching material (in a sufficiently small amount so as to not detrimentally affect the operation of the switching material). For such embodiments, the first seal may also be unreactive with the second seal. The second seal may be reactive with the switching material in an uncured, but not a cured state. The second seal may be sufficiently fast curing so as to complete the curing process before components of the switching material swell and migrate through the first seal. Selection of such a combination of first and second seal materials may be counter-intuitive based on initial testing results, but when combined, provide an improved seal system. Examples of such seal systems may include a PIB first seal material, and an epoxy or EVA second seal material.

In some embodiments, the first seal material may be substantially non-reactive with the switching material and the second seal material; the second seal material may be reactive with the switching material (e.g. swelling, softening or the like). The second seal material may, on the other hand be preferable for resistance to environmental aspects—it may be particularly durable, or resistant to oxygen or water, for example. Selection of such a second seal material may be counter-intuitive based on initial testing results, but when combined with a suitable first seal material, an improved seal system is realized.

Active Layer ("Switchable Layer"):

an active layer comprises a switching material. An active layer as referenced herein may include any solid, semi-solid, gel or liquid material that alters light transmittance in response to a stimulus. An alteration in light transmittance may be a change in one or more of transparency, opacity, color, haze; the reduction in light transmittance may be selective—the a portion of UV, visible or IR light that is transmitted by the active layer may change, or selective wavelengths be blocked, at least in part. The stimulus may include one or more than one of electricity (an electrochromic active layer), temperature or temperature change (a thermochromic active layer), electromagnetic radiation in a range of from about 300 nm to about 750 nm or any amount or range therebetween (UV or visible light) (a photochromic active layer). Some active layers may be responsive to both light and electricity (a photochromic-electrochromic active layer).

Some active layers comprise a polymer or polymer matrix and one or more compounds or compositions that undergo a structural change or orientation in response to the stimulus. For example, a liquid crystal or suspended particle display electrochromic active layer comprises discrete particles suspended in a liquid or semi-solid polymer matrix, and the alignment of the crystals or particles is controlled by application of electricity. Other examples of electrochromic active layers comprise two or more compounds that behave as a redox pair—when electricity is applied, one compound is electrochemically oxidized to a coloured state, and the other is electrochemically reduced to a coloured state. When electricity is removed, the compounds revert to their uncoloured state. Some photochromic materials, when exposed to UV light, change color—darken or fade. Some photochromic materials may have 'memory' in that they remain in the UV-exposed state until a second stimulus is applied; others do not exhibit memory, and will gradually revert to their unexposed state.

Some active layers comprise materials that are both photochromic and electrochromic. When exposed to selected wavelengths of light (e.g. UV light), the materials darken. When exposed to electricity, the materials fade. Examples of compounds (chromophores) that may be useful in a photochromic-electrochromic active layer include some switchable compounds such as photochromic-electrochromic diarylethenes (see, for example U.S. Pat. No. 7,777,055, WO2010/142019 and WO2013/044371). An active layer comprising one or more of these compounds may be transitionable from a faded state to a dark state with exposure to UV light, and from a dark state to a faded state with application of electricity, or light in the visible range.

Switching Material:

a switching material may comprise a polymer and a switchable compound, and optionally, one or more of a plasticizer, dye, UV light stabilizer, antioxidant, supporting electrolyte, surfactant, adhesion promoter or adhesion control agent or the like. The switching material may comprise part of an active layer. The switching material may be a single layer of material (cast or extruded), or maybe two or more layers, cast or extruded sequentially or simultaneously one on top of the other. Generally, the switching material is substantially optically clear, or with minimal (e.g. less than 3%) haze. The switching material may comprise adhesive properties. A switching material may be described as "laminatable" if it retains the ability to fade and darken after lamination (e.g. after elevated temperature and/or pressures used during a glass lamination process). Haze may be measured using methods known in the art, for example use of an XL-211 Hazemeter from BYK-Gardner.

Components of the switching material may further provide, in part, one or more than one secondary functions. For example, any of a switchable compound, polymer, plasticizer, supporting electrolyte, charge carrier or the like may provide a secondary function as one or more than one of a plasticizer (solvent), polymer, supporting electrolyte, or the like. In another embodiment, where a polymer comprises a switching compound, the polymer may provide multiple functionalities, including a combination of polymer and switchable compound, and in some embodiments, a charge carrier function, a plasticizer function and/or a supporting electrolyte function. Inclusion of different switchable compounds and/or different polymer backbone moieties may alter the function of the polymer.

Examples of solvents (which may function as plasticizers in the switching material) include dimethyl adipate, diethyl adipate, 2-(2-butyoxyethoxy) ethyl acetate, triglyme, diethyl succinate, 2,2,4-trimethyl-1,3-pentanediol monoisobutyrate, dimethyl-2-methyl glutarate, butylene carbonate, dibutyl itaconate, tetraethylene glycol di-heptanoate, triethylene glycol di-2-ethylhexanoate, triethylene glycol di-2-ethyl butyrate, triethylene glycol di-n-heptanoate, benzyl octyl adipate, di-n-hexyl adipate, triethylene glycol, combinations thereof, or the like.

Examples of supporting electrolytes include tetrabutylammonium tetrafluoroborate (TBABF$_4$), tetrabutylammonium bis((trifluoromethyl)sulfonyl)imide (TBATFSI).

Examples of polymers include ethylene copolymers (e.g. ethylene-vinyl acetate), apolyurethane, a polyalcohol, an ionomer, PVDF, or the like. Examples of polyalcohols include ethylene vinyl alcohol copolymer, polyvinyl alcohol, polyvinyl acetals (e.g. polyvinyl butyral—PVB), poly (ethylene oxide), or the like. Examples of ionomers include poly(ethylene-co-methacrylic acid, PV5300 (DuPont) or the like. In some embodiments the switching material may comprise a mixture of polymers. Other polymers having a suitable glass transition temperature may also be used. Where ranges, values and/or methods are described with reference to PVB, such ranges, values and/or methods may also apply, where applicable, to other polymers or polymer blends disclosed herein as useful components of switching materials. A polymer may be crosslinked. A crosslinking agent may comprise two or more reactive groups; reactive groups may independently be, for example, aldehyde, epoxide, isocyanate, silane or the like. Examples of aldehyde crosslinkers include terephthalaldehyde and the like. Examples of epoxides include diglycidyl ethers of polypropylene glycol (e.g. DER736, DER732, both from Dow Chemical), bisphenol A diglycidyl ether (BADGE), 1,4-butanediol diglycidyl ether, 1,4-cyclohexanedimethanol diglycidyl ether, and the like. Examples of isocyanate crosslinking agents include hexamethylene diisocyanate (HMDI), dimers, trimmers, or multimers of HMDI (e.g. DESMODUR™ N100, N3300A, N3600 from Bayer) and the like.

The one or more supporting electrolytes may be absent, or present in an amount of from about 0.1% to about 20% (by weight) or any amount or range therebetween, for example 1, 2, 3, 4, 5, 6, 7, 8, 9, 10, 11, 12, 13, 14, 15, 16, 17, 18 or 19%. The one or more plasticizers (solvents) may be absent, or may be present in a switching material in an amount ranging from about 5 wt % to about 90 wt % or any amount or range therebetween. The one or more switchable compounds may be present in a switching material in an amount (% weight) of from about 0.05% to about 80%, or any amount or range therebetween, for example about 5, 10, 15, 20, 25, 30, 35, 40, 45, 50, 55, 60, 65, 70 or 75%. The polymer may be present in an amount of from about 10 wt % to about 95 wt %, or any amount or range therebetween, for example 15, 20, 30, 40, 50, 60, 70, 80 or 90 wt %.

Substrates:

The one or more transparent, or substantially transparent, substrates may be glass—float glass, tempered glass, toughened, or chemically-strengthened glass, an organic glass or the like. The substrate may be flexible (e.g. plastic film, glass film, or glass microsheet). An organic glass is an amorphous, solid glasslike material made of transparent plastic. Organic glass may provide advantages such as toughness, reduced weight, improved thermal insulation, ease of colour modification (incorporation of colorants in the plastic when molding) or the like. Examples of organic glasses or plastics include polycarbonate, acrylonitrile butadiene styrene, polyesters (polyethylene terephthalate (PET), modified PET), acrylics (polymethyl methacrylate) or modified acrylics (e.g. imidized, rubber toughened, stretched or the like), polyester carbonate, allyl diglycol carbonate, polyether imide, polyether sulfone (polysulfone, PSU), cellulose acetate, cellulose butyrate, cellulose propionate, polymethyl pentene, polyolefins, nylon, polyphenylsulfone, polyarylate, polystyrene, polycarbonate, polysulfone, polyurethane, polyvinyl chloride, styrene acrylonitrile, ethylene vinyl acetates, or the like. Where the one or more glass is an organic glass, one or more of the components of the switching material may be selected to be immiscible, or insoluble, with one or more of the components of the organic glass, to prevent diffusion into the glass. For example, a solvent or plasticizer used in some embodiments described herein may be immiscible, or insoluble, with a plasticizer used in an organic glass. Combinations of organic glass and switching material materials with one or more immiscible components may be selected in this way. In some embodiments, a layer of plastic (e.g. PET film) may be included between the organic glass and the switching material, to prevent diffusion of plasticizers or other components into the organic glass. Substrates may independently be of any suitable thickness. Substrates may independently be coated with, or comprise anti-scratch layers, security films, heat or infrared reflecting or absorbing materials, or UV reflecting or absorbing materials or the like. Glass layers may independently be tinted; examples of tinted glass include grey, bronze or green glass, or may comprise coatings or additives to block some wavelengths of light (e.g. portions of UV, VIS, IR incident light or the like).

Glass layers may be tinted. Color and depth of coloration of tinted glass may be selected to achieve certain levels of light transmission (visible, UV or IR), or to harmonize with the site of installation e.g. exterior automotive paint, building envelope, or to harmonize with other components of a laminated glass. Glass color may be described with reference to colour values L*a* and b*, and/or light transmittance ($LT_A$). As examples, U.S. Pat. No. 5,308,805 describes a neutral low transmittance glass and U.S. Pat. No. 7,932,198 describes examples of grey glass.

In some embodiments, a substrate may be clear, or may be grey, with an $LT_A$ of about 25-35% or any amount or range therebetween. A second substrate may be clear, or may be colored (e.g. grey), with an $LT_A$ of about 75-85% or any amount or range therebetween. A substrate may be glass or plastic (an "organic glass"). A substrate may be flexible or rigid. A substrate may be coloured to harmonize with the exterior paint of the vehicle or building where the laminated glass is installed, or to mask the inherent color of one or more layers in the laminated glass (e.g. the active layer, the static filter or the incident light filter, for embodiments where one or more of these layers has a colour that does not harmonize with the surrounding surface or paint). Alternately, a substrate may be substantially clear to allow as much light as possible reach the active layer.

Where the glass is an organic glass, it may be advantageous to include a layer of plastic (e.g. PET film) between the organic glass and an adhesive layer or sound insulating layer comprising PVB, to prevent diffusion of plasticizers or other components of the adhesive layer into the organic glass.

The substrate may be of uniform or varying thickness, and of any suitable dimension. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of a first substrate differs from the thickness and/or material of a second substrate.

Conductive coatings may be transparent. A conductive coating may include a transparent conducting oxide (TCO) such as indium tin oxide (ITO), fluorine tin oxide (FTO) or the like, metal or metal oxide coatings (e.g. silver, gold or the like), transparent conducting polymers, or other substantially transparent conductive coatings. Examples of transparent substrates with conductive coatings include ITO-coated glass, or FTO-coated glass (e.g. TEC glass from Pilkington). For embodiments comprising co-planar electrodes, the electrode pattern (e.g. interdigitated electrodes such as that illustrated in FIG. 3c) may be etched into a conductive coating on the substrate, or printed on a substrate. In some embodiments, a substrate with a conductive layer may be ITO-coated glass, or ITO-coated PET. A conductive coating may be an electrode of a switchable film.

Some methods of manufacture of conductive coatings may necessitate use of selected substrates that tolerate the coating methods. For example, FTO coatings may be less expensive, and thus an attractive substrate and conductive coating, but require a substrate that tolerates the high temperatures (>400° C.) used in some coating methods. Glass may be suitable for this application, however some plastics or films may not. Having a switchable switching material that may be laminated between FTO-coated substrate may provide a less expensive laminated glass.

In some embodiments, both first and second electrodes may be disposed on one substrate. First and second coplanar electrodes may be etched into the conductive coating or printed on the surface of the substrate in a suitable pattern e.g., a discontinuous conductive coating providing first and second electrodes on the same substrate. In such embodiments, a second substrate may lack a conductive coating, and first and second busbars and electrical connectors may be disposed on the first and second electrodes of the first substrate. in such embodiments, the second substrate (lacking a conductive coating) may be a plastic or glass, or a film or release liner. PCI publication WO2012/079159 describes coplanar electrode configurations that may be useful in some embodiments.

Making a Switchable Film:

In some embodiments, components of the switching material may be combined in subcombinations ('parts'), with the parts combined at a later step. Preparation of a switching material in one or more parts may be advantageous to solubilize one or more components of a switching material, prevent side reactions, or to prevent initiation of crosslinking ('curing') before the formulation is complete or ready for casting or coating. In some embodiments, a switching material may be prepared according to the following steps: providing a first part comprising a polymer, a switching compound, a salt and a first portion of a solvent; providing a second part comprising one or more crosslinking reagents and a second portion of the solvent; providing an accelerant and an optional co-solvent; combining the first part and the second part; and combining the third part with the combined first and second parts.

The switching material may be coatable. A coatable switching material is one that is of suitable viscosity to be applied to a substrate in a suitable thickness and substantially uniform manner. Viscosity of a switching material may be altered by increasing or decreasing the quantity of sacrificial solvent, altering the polymer (different quantity and/or molecular mass), increasing or decreasing temperature of the switching material, inclusion of a rheology modifier or the like. In some embodiments, the switching material does not include a sacrificial solvent, and viscosity is manipulated by heating the switching material and/or using a heated die for coating. Partial curing of the switching material in advance of, or during the process of coating, may also increase the viscosity of the switching material applied to a moving web, or extruded or injected into a mold or extruded or applied onto a substrate. Curing may be slowed or stopped by decreasing temperature, and/or diluting the partially cured material with a co-solvent. Increasing temperature and/or removal of the co-solvent may subsequently allow curing to proceed to completion.

A switching material, or one or more parts thereof may be treated to remove dissolved gas (oxygen, air, or the like), and/or treated to remove water, or prepared in an environment with reduced oxygen and/or reduced humidity. In some embodiments, one or more of the steps of making a switchable formulation, coating a substrate, and/or curing the film may be performed in an inert atmosphere (e.g. nitrogen, with less than 100 ppm oxygen, less than 100 ppm water, or both); a reduced humidity atmosphere (e.g. about 5-15% relative humidity), or in an open atmosphere. In some embodiments, a method of making a coatable formulation, coating of substrates and/or curing of a switching material may be performed in a reduced humidity and/or reduced oxygen environment, for example less than 100 ppm relative humidity, and/or less than 100 ppm oxygen.

A switching material may be coated at a suitable thickness onto a conductive coating of a substrate using a slot die, knife coater, roll-to-roll coating method, extrusion, dipping, spraying, spin coating, gravure coating method, hand-drawing or the like. A suitable coating thickness may be selected such that the switching material is of the desired thickness once the co-solvent is evaporated (if a co-solvent is present), or the final layer is of the desired thickness following cooling and/or crosslinking of the coated switching material. For example, to obtain a final thickness of about 50 microns, a switching material with co-solvent may be applied to the substrate in a layer of about 100 to about 120 microns. A second layer of substrate is laminated on top of the coated switching material (conductive side in contact with the switching material) to form a sandwich structure. The 'sandwich' may be cured, or allowed to continue to cure (if curing is initiated during the coating or laminating process) and if desired, cut to a suitable size. Busbars or other electrical contacts may be added if desired.

A second substrate may be applied on top of the disposed switching material; the second substrate may comprise a conductive layer, positioned so as to be in contact with the switching material. The resulting film may be cut to a desired size or shape. Electrical contacts (e.g. busbars, wires or the like) may be added, to facilitate application of a voltage to the switching material.

The switching material may be cured or crosslinked before, or after application of the second substrate. The step of curing may comprise heating the switching material to a temperature suitable for crosslinking (e.g. about 20° C. to about 90° C., or any amount or range therebetween. The step of disposing may be preceded by a step of filtration of the switching material.

In other methods, a switching material, or one or more components of a the switching material, may be formed into pellets, chips or flakes and mixed with other components (e.g. in a screw mixer) and extruded through a die to form one or more layers or films. The mixer, die and/or extruder may be heated. Alternately, the extruded material may itself be pelletized, for subsequent blending with other materials and extruded in a second extruder to produce a switchable film, or molded to produce a switchable article. One or more additional components may be imbibed or soaked into the cast layer. If the switching material is to be crosslinked, this may be done before or after removal of sacrificial solvent (if used). The switching material may be configured to include spaced projections defining a surface irregularity (a "rough texture")—if such a switching material is laminated with heat and pressure between rigid substrates, the surface irregularity may facilitate removal of air from during the lamination process, and/or to facilitate handling of the unlaminated switching material.

In some embodiments, two or more layers of switching material may be co-extruded, or a first layer (e.g. comprising the switchable compound as a monomer, or as part of a switchable polymer) may be applied (coated) onto the second layer. A release liner may be used for support in handling, and/or separation of layers when rolled for storage and handling. Following application, the first layer, or a component thereof may remain as a discrete layer, or may diffuse into the second layer to create a gradient, or may be imbibed into the second layer to provide a substantially uniform distribution, or a gradient distribution, of switchable compound within the second layer. Where a gradient is formed, the gradient may comprise a region of higher concentration along one surface of the second layer, and a region of lower concentration extending through the plane of the second layer. In other embodiments, the gradient may be established so as to extend along the plane of the second layer. In other embodiments comprising a composite switching material, a first layer may be applied to a first substrate, and a second layer applied to a second substrate (e.g. disposed on a conductive coating on the surface), and the substrates arranged to place the first and second layers adjacent, and the substrate-switching material-substrate sandwich laminated. The first layer may be applied to the second layer, or to a substrate by any of several methods, for example electrodeposition, vapor deposition, chemical deposition, chemical plating, brushing, spraying, extruding, slot-die coating, dipping or the like, or a combination thereof. If a co-solvent is used, it may be removed by evaporation. Where it is desired to vary the color or color density of the switching material, the switching compound may be applied using printing methods that deposit droplets of varying size and/or spacing—for example, smaller, and/or more widely spaced dots yield regions of lesser switching material, while larger, and/or more closely spaced dots yield regions of greater switching material.

A layer of switchable compound may be imbibed into a surface of the polymer, or may be applied as a layer of liquid and dried to a solid or semi-solid, or may be a solid or semi-solid of any suitable thickness; a suitable thickness may be selected dependent on the concentration of the switchable compound and the desired deposition amount. In some embodiments, the layer of switchable compound is of uniform, or substantially uniform, thickness. In some embodiments, the layer of switchable compound is of non-uniform thickness. The switchable compound may be in a crystallized form, or may be amorphous, or a combination thereof.

Busbars, Controls and Applied Potentials:

Busbars may be applied to a portion of the conductive layer or electrodes so that a voltage differential is created across the layer (s) comprising the switchable material to effect the switch. The busbars may be of any suitable material to provide a low-profile conductive area suitable for attachment of an electrical connector thereto. Examples of suitable materials include conductive adhesive, conductive ink, conductive epoxy, conductive tape, metal mesh or film or the like, comprising at least one type of conducting material for example a metal, such as aluminum, gold, silver, copper or the like. The conductive material may be applied to the conductive surface by any of several methods known in the art, including printing, painting, screenprinting ('silk-screening'), stenciling (stencil printing) or the like. Electrical connectors or leads may be of any suitable material and may be affixed to the bulbar by any suitable methods, including adhesion (conductive adhesive or conductive epoxy), soldering, clips, rivets or the like. Suitable material for electrical connectors may include conductive tape, wire, copper tape, copper-clad polyimide film (e.g. Kapton) or the like. The electrical connector may be doubled-sided.

A control circuit can be used to switch the electrical voltage on or off, based on input from an automated or semi-automated device (e.g. an irradiance meter, thermometer), a building or vehicle environmental control system, a user or some other input, and can also be used to modulate the voltage to a predetermined level. A power source may include an AC line voltage in a house or other building, a DC power source (e.g. a battery of a vehicle, or in a separate battery or power pack), an energy harvesting power source (e.g. solar panel) or the like. The control circuit may comprise one or more switches (transistor, relay, or electro-mechanical switch) for opening and closing a circuit between the voltage regulators and conductive layers of a substrate, an AC-DC and/or a DC-DC converter for converting the voltage from the power source to an appropriate voltage; the control circuit may comprise a DC-DC regulator for regulation of the voltage. The control circuit can also comprise a timer and/or other circuitry elements for applying electric voltage for a fixed period of time following the receipt of input.

Embodiments include switches that can be activated manually or automatically in response to predetermined conditions, or with a timer. For example, control electronics may process information such as time of day, ambient light levels detected using a light sensor, user input, stored user preferences, occupancy levels detected using a motion sensor, or the like, or a combination thereof, the control electronics configured to activate switches for applying voltage in response to processed information in accordance with predetermined rules or conditions. In one embodiment, the power control electronics comprises a user-activated switch. A user-activated switch may be a 'normally-open', or 'normally-closed' switch, for example a push-button switch. A switch may be configured to remain closed for a predetermined amount of time following actuation, thereby facilitating application of voltage for sufficient time to effect a state transition. Where the multilayer composition according to various embodiments is part of an automotive glazing (window or sunroof, or the like), the glazing may be installed in the vehicle and electrically connected to the vehicle's electrical system, through wiring in the frame, dash or roof, or connected to rails or guide tracks as may be used for some automotive roof applications.

In one embodiment, the control electronics comprises a user-activated switch that passes the DC voltage from the power source substantially directly to a conductive layer on a substrate. The user activated switch can be a normally-open push button, or another type of switch. A switch may be configured to remain closed for a predetermined amount of time following actuation, thereby facilitating application of voltage for sufficient time to effect a state transition.

The voltage to be applied for transitioning the switching material may be from about 0.1 V to about 20 V, or any amount or range therebetween. In some embodiments, the amount of voltage applied is from about 0.1 V to about 5V, or from about 1V to about 10 V, or from about 1.0 V to about 2.2 V, or from about 0.5V to about 3V, or from about 1.2V to about 2.5 V, or from about 1.8 V to about 2.1 V, or any amount or range therebetween. In some embodiments, the voltage applied is less than about 12 V, or less than about 6 V, or less than about 3 V or less than about 2.5 V, or about 2 V.

The polarity of the voltage applied to a switching material may be switched or alternated over a plurality of cycles to transition the assembly from a dark state to a faded state. Such polarity switching may decrease the fading time. A voltage of a first polarity may be applied across the optical filter for a first interval; followed by applying a voltage of a second, opposite polarity across optical filter for a second interval. The cycle of first and second intervals may be repeated until the optical filter is transitioned to a faded state. The first and second polarity may be of equivalent but opposite magnitude. The first and second intervals may be of equivalent magnitudes. The first and second intervals may be from about 0.5 seconds to about 60 seconds, or any amount therebetween.

Control circuits and systems that may be used with an apparatus comprising a switching material, or layered compositions according to various embodiments are described in, for example, PCT publication WO2010/142019.

Other layers that may be incorporated into a laminated glass may include:

IR-Blocking:

One or more layers may comprise an infra-red (IR)-blocking component. A solar control film may be included in the multi-layer composition or laminated glass. Alternately IR blocking materials may be incorporated into a layer of glass, or an adhesive layer. An IR blocking layer may reflect or absorb IR light. Reflection of IR may reduce the solar heat gain of the interior space, whereas absorption of IR may increase the temperature of the laminated glass, which may be advantageous in increasing the switching speed of the switching material. In some embodiments, one or IR blocking compounds or materials may be incorporated into the switching material.

UV-Blocking:

One or more layers may comprise a UV blocking component. Adhesive layers such as PVB may have additives that block UV; some transparent layers, or some substrates may be made of a material that has been treated with a UV blocking material (e.g. UV-blocking PET), or have a UV blocking layer applied thereto. It may be cost effective to incorporate into an optical filter or device comprising an switching material according to various embodiments, a substrate that blocks UV—this may be advantageous in reducing the amount, or controlling the wavelength, of UV light incident on the switching material, while preserving the ability to switch. In some embodiments, one or more UV blocking compounds or materials may be incorporated into the switching material. Examples of UV blocking compounds may include benzotriazole compounds (e.g. Tinuvin 328, Tinuvin 326, Tinuvin 234 (Ciba-Geigy)), benzophenone compounds, malonic ester compounds (e.g. Hostavin PR-25 Hostavin B-CAP (Clariant)), triazine compounds, (e.g. Tinuvin 400, Tinuvin 405, Tinuvin 460, Tinuvin 1577 (Ciba-Geigy); LA-46 (Adeka)), oxanilide compounds (e.g. Sanduvor VSU (Clariant)), titanium dioxide, or the like. Other compounds that may inhibit photodegradation may include hindered amine light stabilizers (HALS; e.g. LA-63P (Adeka), Tinuvin 144 (Ciba-Geigy)).

Sound Insulation:

Sound insulation may be provided by an acoustic layer. Acoustic PVB may be known by trade names such as SAFLEX™ or VANCEVA™. U.S. Pat. No. 5,190,826 describes composition comprising two or more layers of resins of differing polyvinyl acetals; the acoustic layer may be in the range of 0.2 to 1.6 mm. Some acoustic PVB may comprise an acrylic polymer layer and polyester film layer. Acoustic layers comprising PVC, modified PVC, polyurethane or the like may also be used.

Self-Cleaning Coating:

a self-cleaning coating may be applied to an outboard surface of the laminated glass. Several examples of such coatings, and methods of applying them are known—examples include hydrophilic coatings based on $TiO_2$ (e.g. Pilkington ACTIV™) and hydrophobic coatings (e.g. AQUACLEAN™ or BIOCLEAN™)

Security Coating:

A security coating may be applied to the laminated glass to prevent release of glass particles from laminated glass failure (breakage). Examples of such materials include PVB/PET composites or hard-coated PET films (e.g. SPALSHIELD™ (DuPont).

Anti-Scratch:

an abrasion-resistant coating may be applied to the laminated glass to prevent distortion or surface damage, and preserve optical clarity; anti-scratch coatings may be particularly beneficial for use with organic glass.

In some embodiments, inclusion of an IR blocking layer, a UV blocking layer, or both an IR blocking layer and a UV blocking layer in a laminated glass comprising an switching material according to various embodiments may improve durability of the switching material. Without wishing to be bound by theory, a UV blocking layer positioned between a light source and the switching material may limit the energy, and/or overall quantity of UV light reaching the switchable switching material to effect the switch (e.g. it may act as a cutoff filter), and an IR blocking layer positioned between a light source and the switching material may reduce the heat gain of the switching material. Maintaining a lower temperature and/or reducing or blocking higher energy UV light incident on the switching material may prolong the life of the switching material and thus the laminated glass.

Coatings or treatments applied to the inboard or outboard surfaces of laminated glass are generally optically clear. Other examples of coatings or treatments may include anti-glare or anti-reflective coatings.

The term "mil" as used herein, refers to the unit of length for ¹/₁₀₀₀ of an inch (0.001). One (1) mil is about 25 microns; such dimensions may be used to describe the thickness of layer, according to some embodiments of the invention. One of skill in the art is able to interconvert a dimension in 'mil' to microns, and vice versa.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods Laminated glass may be assessed with reference to light stability, humidity, temperature impact tests or the like (e.g. ANSI Z26.1; ECE R43 or other standards). A laminated glass may further comprise one or more additional layers that may be passive (not switchable). A passive layer may provide a chemical, atmospheric or moisture barrier, or may provide for scratch resistance. A passive layer may comprise UV or IR blocking agents. A passive layer may form part of a seal.

In some embodiments, the laminated glass may be integrated into an insulating glass unit (IGU). An IGU comprises two or more glass panes, often with an insulating layer between, and held in a frame, or held together as a unit. Spacers may maintain the separation between the glass layers, and the insulating layer between may be gas (e.g. argon, nitrogen, air or the like). A seal or gasket around the perimeter of the panes within the frame holds the panes in place, and mitigates ingress or egress of gas from the IGU space. The seal may further include a dessicant to absorb any moisture that may be present. An IGU comprising a switchable laminated glass may be assembled in a manner similar to conventional IGU, with the addition of electrical connectors to provide power to the switching material; the electrical connectors may extend through the seal and/or frame. The insulating capabilities of an IGU may lead to higher temperature exposure of the switching material, and to reduce or mitigate solar heat gain, one or more layers of glass in the IGU may comprise an IR blocking material.

The following non-limiting examples provide illustrations of some embodiments.

Methods

Seal and switching material compatibility testing: A 100-300 mg sample of a sealing material, record initial mass and immerse in a plasticizer or solvent used with a switching material or switching material for 48 hours at 90° C. Remove the sample, remove surface liquid (with a kimwipe) and record mass, and inspect for change in size, texture or condition. Crumbling or dissolution may indicate a sealing material is incompatible with the plasticizer or solvent; a mass increase of 10% or less may indicate that a sealing material is compatible with the plasticizer or solvent.

Making a switchable film: a layer of switching material of about 0.5 to about 2.5 mil thickness is disposed between first and second substrates, each substrate comprising a transparent conductive coating (e.g. Melinex ST504, DuPont-Teijin Films—5 mil PET film with 50-100 ohm/square ITO coating). Kiss-cutting and encapsulating of a switchable film: A switchable film is cut to a desired size, and offset edges kiss-cut using a GCC Spirit GLS laser cutter (30W Synrad $CO_2$ laser), under a nitrogen blanket. Laser power was set to 4%, with 1500 pulses per inch. Weed portions are removed and the surface exposed by removal of the weed portion cleaned gently with isopropanol Silver ink (Fujikura Kasei Dotite 301) bus bars may be screenprinted onto the first and second conductive surfaces, or silver epoxy may be applied onto the first and second conductive surfaces. Kapton leads (copper-clad polyimide, DuPont Pyralux AC352500R) may be applied to the busbars. A first seal is applied along the cut edge of the switching material, and the first-scaled film is sandwiched between layers of transparent PET film (external PET layers), held by an adhesive layer (3M 8211). A second seal material is applied adjacent the first seal and between the external PET layers.

Example 1

Devices with a range of switching materials (Table 2) were constructed, and the seal integrity compared. PIB as a first seal material demonstrated some swelling when exposed to the switching material, likely absorbing some of the solvent phase from the crosslinked film. While the rate of absorption was slow, it was indicative that PIB alone may not provide a suitable seal material for longer term, unless it were paired with a second seal material.

TABLE 2

Switching materials. Quantities provided in wt %.

| Component | 6 | 8.1a | 8.2 | 8.4j |
|---|---|---|---|---|
| Chromophore | 10 | 15 | 15 | 15 |
| ZnOctoate | 0.01 | 0.01 | 0.01 | 0.01 |
| N3600 | 0.2 | | | 0.21 |
| HMDI | | 0.37 | 3.75 | |
| TBA-TFSI | | 1 | 1 | 1 |
| TBABF4 | 2 | | | |
| PVB-8 | 7 | | 3 | 5 |
| PVB-5 | | 10 | 10 | |
| PVB-4 | | 3 | | |
| PVB-6 | | | | 10 |
| BC | | 7 | 6.7 | |
| RI | | 63.6 | | 68.8 |
| Texanol | 80.79 | | | |
| DES | | | 60.5 | |

Abbreviations:
"Texanol", 2,2,4-trimethyl-1,3-pentanediol monoisobutyrate;
"RI", dimethyl-2-methyl glutarate;
"BC" butylene carbonate;
"DES", diethyl succinate.
PVB resins employed in the switching materials demonstrated a range of MW, PVOH and PVA contents.
PVB-4 (MW 95-105k, PVOH content 18-21%, PVA content 0-4%);
PVB-5 (MW 50-60k, PVOH content 12-16%, PVA content 1-4%);
PVB-6 (MW 250-350k, PVOH content 12-16%, PVA content 6-10%): PVB-8 (MW 170-250k, PVOH content 17.5-20%, PVA content 0-2.5%).

TABLE 3 switching material and seal combinations

| Switching material # | Switching material Solvent | First seal | Second seal | Indicator/ trigger Interaction |
|---|---|---|---|---|
| 6 | TX | PIB (Tremco 440) | Epoxy (E-30CL) | Y |
| 8.1a | RI/BC | PIB (Tremco 440, Oppanol B1, B15) EVA (3M 3764) | Epoxy (E-30CL) | Y |
| 8.2 | DES/BC | PIB (Tremco 440, Oppanol B10, B15) EVA (3M 3764) | Epoxy (E-30CL) | Y |
| 8.4j | RI | PIB (Oppanol B10, B15) | Epoxy (E-30CL) | Y |

For test switching materials sealed with a single seal material, bleed-in of some seal materials (e.g. epoxy) occurs before the seal is cured. PIB did not exhibit any bleed-in, however it has absorbed solvent and exhibits flow at elevated temperature (e.g. when laminating the film). A PIB first seal, and an epoxy second seal combined the characteristics of each to provide a flexible, durable seal that did not fail with handling and lamination. The PIB was a temporary seal, preventing the switching material from contacting the epoxy while curing. Once cured, the epoxy constrains the PIB so it does not flow during elevated temperatures.

Example 2

Films comprising a switching material, sealed with a PIB first seal, and an epoxy second seal as set out in Table 3 were tested for indicator/trigger interaction (signifying a compromised first seal). The indicator in the active layer was a diarylethene chromophore, and the trigger the epoxy material. Sealed films were subjected to mechanical stress, or were assembled with an incomplete first seal (first seal was laid down without covering the complete circumference of the switching material), and observed during and after epoxy cure. Films that were manipulated (bent or flexed during cure), or with an incomplete seal demonstrated a blue stain at the region of the breached first seal. The epoxy is a two part curable thermosetting epoxy resin comprising an epoxy resin, and an epoxy resin hardener.

Other Embodiments

It is contemplated that any embodiment discussed in this specification can be implemented or combined with respect to any other embodiment, method, composition or aspect, and vice versa. Figures are not drawn to scale unless otherwise indicated.

The present invention has been described with regard to one or more embodiments. However, it will be apparent to persons skilled in the art that a number of variations and modifications can be made without departing from the scope of the invention as defined in the claims. Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art to the present invention, nor as any admission as to the contents or date of the references. All publications are incorporated herein by reference as if each individual publication was specifically and individually indicated to be incorporated by reference herein and as though fully set forth herein. The invention includes all embodiments and variations substantially as hereinbefore described and with reference to the examples and drawings.

What is claimed is:

1. A sealed film comprising:
a first and a second substrate, wherein the first and the second substrates are in an offset relationship so as to define an offset area of at least one of the first and second substrates;
a first and a second electrode disposed on the surface of at least one of the substrates;
a switching material disposed between the first and second substrates;
a first seal and a second seal, the first seal disposed along an edge of the switching material, separating the switching material from the second seal, wherein the second seal is disposed upon the offset area of the at least one of the first and second substrates.

2. The sealed film according to claim 1 wherein the switching material is in contact with the first and second electrodes.

3. The sealed film according to claim 1 wherein the first seal is disposed upon the offset area of the at least one of the first and second substrates.

4. The sealed film according to claim 1 wherein the first substrate is offset along at least two adjacent edges relative to the second substrate.

5. The sealed film according to claim 1 wherein the first and second electrodes comprise a transparent conductive metal oxide.

6. The sealed film according to claim 1 wherein the first seal contacts the first electrode, the second electrode, or the first electrode and the second electrode.

7. The sealed film according to claim 1 further comprising a first pair of electrical connectors.

8. The sealed film according to claim 7 further comprising a second pair of electrical connectors.

9. The sealed film according to claim 7 or claim 8 wherein the electrical connectors are encapsulated with the second seal.

10. The sealed film according to claim 1 wherein the first seal, the second seal, or the first and second seal, independently comprise an elastomeric material, the elastomeric material preferably being silicone rubber, natural rubber or synthetic rubber.

11. The sealed film according to claim 1 wherein the first seal, the second seal or the first and the second seal independently comprise a thermoplastic polymer, a thermoset polymer, or a thermoplastic polymer and a thermoset polymer.

12. The sealed film according to claim 1 wherein the first seal is non-reactive with the switching material.

13. The sealed film according to claim 1 wherein the first seal is substantially non-absorbing of the switching material or a component of the switching material.

14. The sealed film according to claim 1 wherein the first seal, the second seal, or the first seal and the second seal, is gas-impermeable or water-impermeable.

15. The sealed film according to claim 1 wherein the first seal, the second seal, or the first seal and the second seal, is electrically insulating.

16. The sealed film according to claim 1 wherein the film is a lens-shaped film, comprising a cutout section and a nose bridge section.

17. A method for sealing a switchable film comprising:
a. providing a switchable film comprising a first and a second substrate, wherein the first and the second substrates are provided in an offset relationship so as to define an offset area of at least one of the first and second substrates, with a first and a second electrode disposed on the surface of at least one of the substrates, and a switching material disposed between the first and second substrates;
b. disposing a first seal in contact with an electrode and adjacent to the switching material; and
c. disposing a second seal adjacent to the first seal, wherein the second seal is disposed upon the offset area of the at least one of the first and second substrates.

18. A laminated glass comprising:
a first substrate and a second substrate, wherein the first and the second substrates are in an offset relationship so as to define an offset area of at least one of the first and second substrates;

a first electrode and a second electrode disposed upon the first substrate, the second substrate, or the first substrate and the second substrate;
a layer of switching material disposed between the first and the second substrates and in contact with the first and the second electrodes;
an electrical connector for electrically connecting the first and the second electrodes to a power source;
a first seal contacting an edge of the layer of switching material; and
a second seal disposed upon the offset area of the at least one of the first and second substrates.

* * * * *